United States Patent
Ohashi

(10) Patent No.: US 7,296,012 B2
(45) Date of Patent: Nov. 13, 2007

(54) METHOD OF AND APPARATUS FOR MULTIMEDIA PROCESSING, AND COMPUTER PRODUCT

(75) Inventor: Tadashi Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/633,551

(22) Filed: Aug. 5, 2003

(65) Prior Publication Data

US 2004/0049569 A1  Mar. 11, 2004

(30) Foreign Application Priority Data

Sep. 5, 2002  (JP)  ............................. 2002-260669

(51) Int. Cl.
*G06F 7/00* (2006.01)
(52) U.S. Cl. ............................. 707/3; 707/10; 707/200; 709/202
(58) Field of Classification Search ..................... 707/1, 707/3, 200; 345/854; 705/2, 3
See application file for complete search history.

(56) References Cited

U.S. PATENT DOCUMENTS 6,049,819 A * 4/2000 Buckle et al. .............. 709/202
2002/0059210 A1 * 5/2002 Makus et al. .................. 707/3
2002/0165856 A1 * 11/2002 Gilfillan et al. ................ 707/3
2003/0214538 A1 * 11/2003 Farrington et al. ......... 345/854
2004/0003005 A1 * 1/2004 Chaudhuri et al. ......... 707/200
2004/0128282 A1 * 7/2004 Kleinberger et al. ........... 707/3

FOREIGN PATENT DOCUMENTS

| JP | 11-096177 | 4/1999 |
| JP | 2000-322303 | 11/2000 |
| JP | 2002-063033 A | 2/2002 |
| JP | 2002-183174 | 6/2002 |

* cited by examiner

*Primary Examiner*—Charles Rones
*Assistant Examiner*—Belix M Ortiz
(74) *Attorney, Agent, or Firm*—Staas & Halsey LLP

(57) ABSTRACT

A name obtaining unit obtains name information. An ontology generating unit sets a specific element from an installation space where each element to be given a name is hierarchically expressed, generates an ontology as a group of name candidates with the set element as a top level based on the name information, and links each name constituting the ontology with multimedia information. The ontology generating unit registers the linked multimedia information at a multimedia information database.

17 Claims, 21 Drawing Sheets

| INSTALLATION NUMBER (POSITION) | PART NAME | MODEL NAME | MANUFACTURER NAME |
|---|---|---|---|
| ⋮ | ⋮ | ⋮ | ⋮ |

US 7,296,012 B2

METHOD OF AND APPARATUS FOR MULTIMEDIA PROCESSING, AND COMPUTER PRODUCT

BACKGROUND OF THE INVENTION

1) Field of the Invention

The present invention relates to a technology for increasing the efficiency of managing multimedia information based on names.

2) Description of the Related Art

Manufacturers use various kinds of names such as development code names, drawing numbers, part names, firmware names, and software names in a series of operation processes including product planning, designing, manufacturing, and field support. In each operation process, the operation is performed based on names as keys. Further, in each operation process, a considerable amount of text information, image information, and acoustic information is used as multimedia information. See, for example, Japanese Patent Application Laid-Open No. 2002-63033 for details.

However, since it is difficult to perform checking of duplication inside and outside facilities and setting of management rule thoroughly when giving a name or using multimedia information, checking is apt to be omitted and it is difficult to manage the multimedia information.

SUMMARY OF THE INVENTION

It is an object of the present invention to solve at least the problems in the conventional technology.

The multimedia processing apparatus according to one aspect of the present invention includes a setting unit that sets a specific element from an installation space where each element to be given a name is hierarchically expressed, a generating unit that generates a name space ontology based on name information, wherein the name space ontology is a group of name candidates with the set element as a top level, and a linking unit that links each name constituting the name space ontology with multimedia information.

The multimedia processing method according to another aspect of the present invention includes setting a specific element from an installation space where each element to be given a name is hierarchically expressed, generating a name space ontology based on name information, wherein the name space ontology is a group of name candidates with the set element as a top level, and linking each name constituting the name space ontology with multimedia information.

The computer program according to still another aspect of the present invention realizes the multimedia processing method according to the present invention on a computer.

The other objects, features and advantages of the present invention are specifically set forth in or will become apparent from the following detailed descriptions of the invention when read in conjunction with the accompanying drawings.

DETAILED DESCRIPTION

Exemplary embodiments of a computer program, a multimedia processing apparatus, and a multimedia processing method according to the present invention are explained in detail below with reference to the accompanying drawings.

Figure 1:
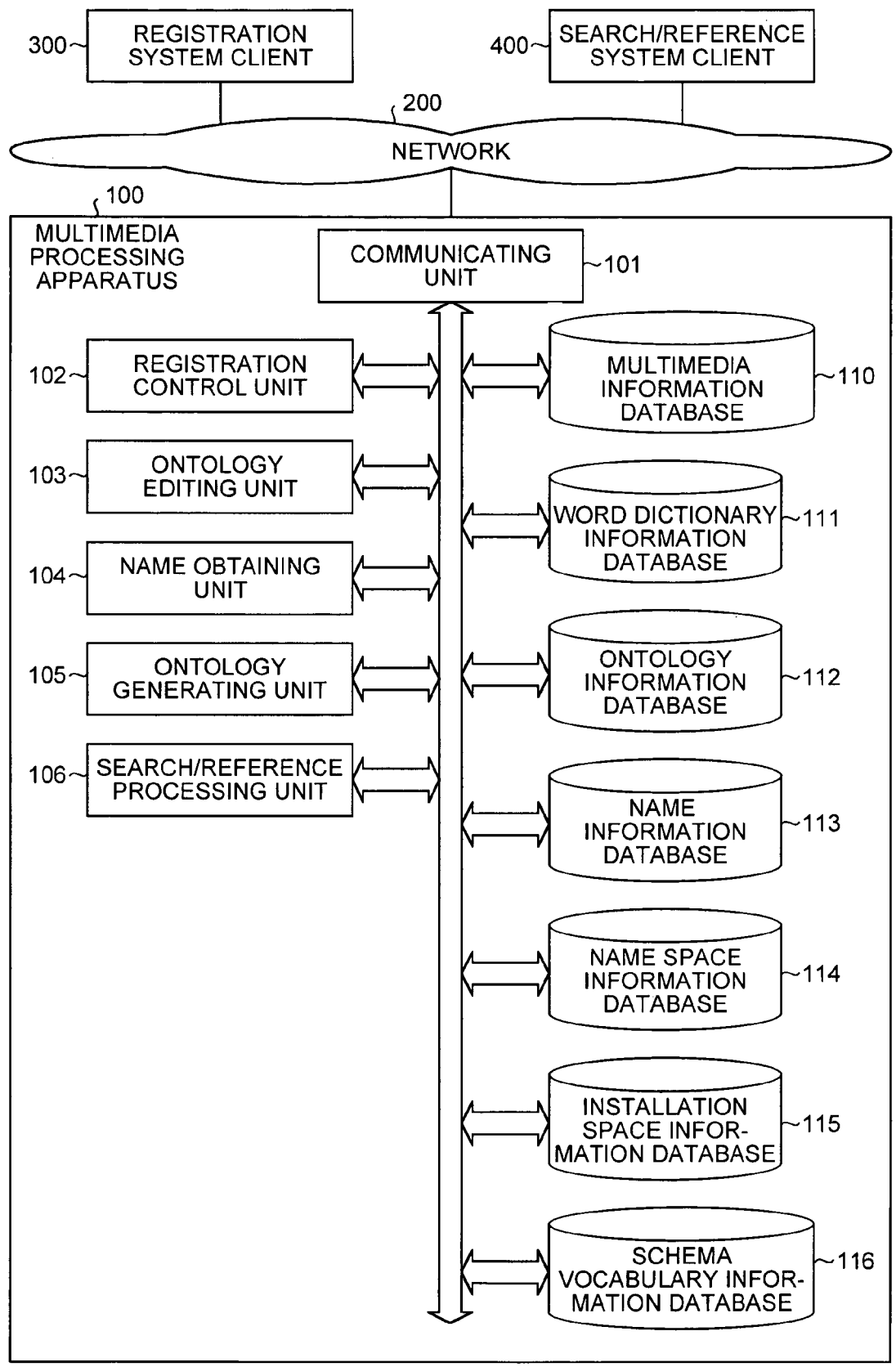
FIG. 1 is a block diagram representing the structure of a system according to an embodiment of the present invention.

FIG. 1 is a block diagram representing the structure of a system according to an embodiment of the present invention. A multimedia processing apparatus 100 executes a naming service of providing names using ontology, and a management service of managing multimedia information corresponding to the names.

A communicating unit 101 of the multimedia processing apparatus 100 controls communications between the multimedia processing apparatus 100, a registration system client 300, and a search/reference system client 400 via a network 200 based on a predetermined communication protocol.

The registration system client 300, which is a computer terminal that registers name information and ontology information, accesses the multimedia processing apparatus 100 via the network 200.

The search/reference system client 400, which is a computer terminal to search for names and multimedia information, accesses the multimedia processing apparatus 100 via the network 200.

Figure 2:
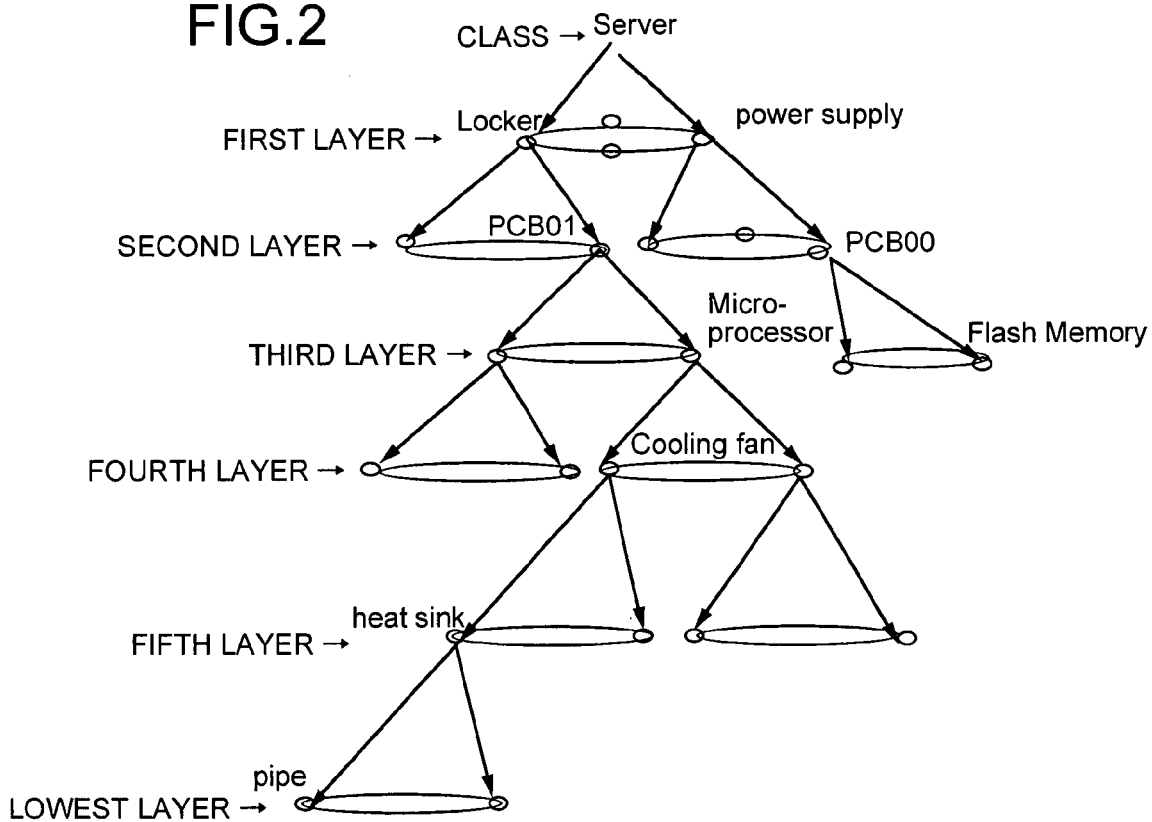
FIG. 2 is a schematic of the installation space in the system according to the embodiment.

An installation space and a name space (ontology) are the key points. The installation space represents elements that are installed on a specific apparatus, in a hierarchical structure (including a class, and a first layer to the lowest layer) as shown in FIG. 2. In the example shown in FIG. 2, a server is the class.

The first layer includes a locker and a power supply. The second layer includes a PCB01 (printed circuit board 01) that belongs to the locker of the first layer, a PCB00 (printed circuit board 00) that belongs to the power supply of the first layer, and the like.

The third layer includes a microprocessor that belongs to the PCB01 of the second layer, a flash memory that belongs to the PCB00 of the second layer, and the like.

The fourth layer includes a cooling fan that belongs to the microprocessor of the third layer, and the like. The fifth layer includes a heat sink that belongs to the cooling fan of the fourth layer, and the like. The lowest layer includes a pipe that belongs to the heat sink of the fifth layer, and the like. In this manner, the elements that constitute the apparatus are expressed hierarchically in the installation space.

Figure 3:
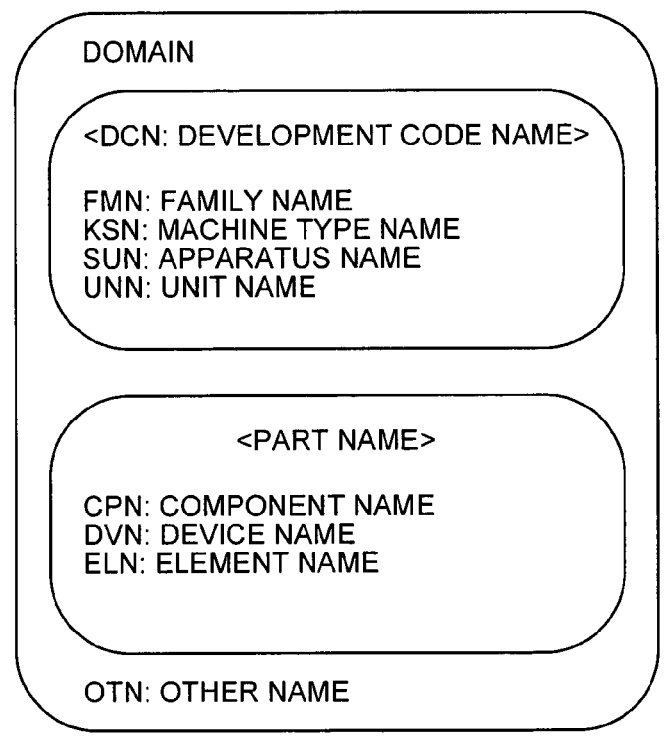
FIG. 3 is a schematic of the name information in the system according to the embodiment.

The elements that constitute an apparatus are usually given their own names. FIG. 3 is a schematic of name information according to the embodiment. For the apparatus, a DCN (development code name), a part name, and an OTN (other name) belong to the same domain. The DCN is provided in relation to the development of a corresponding apparatus, and includes an FMN (family name), a KSN (machine type name), a SUN (apparatus name), and a UNN (unit name).

The part name includes a CPN (component name), a DVN (device name), and an ELN (element name). The ELN is the minimum unit of the name.

Figure 4:
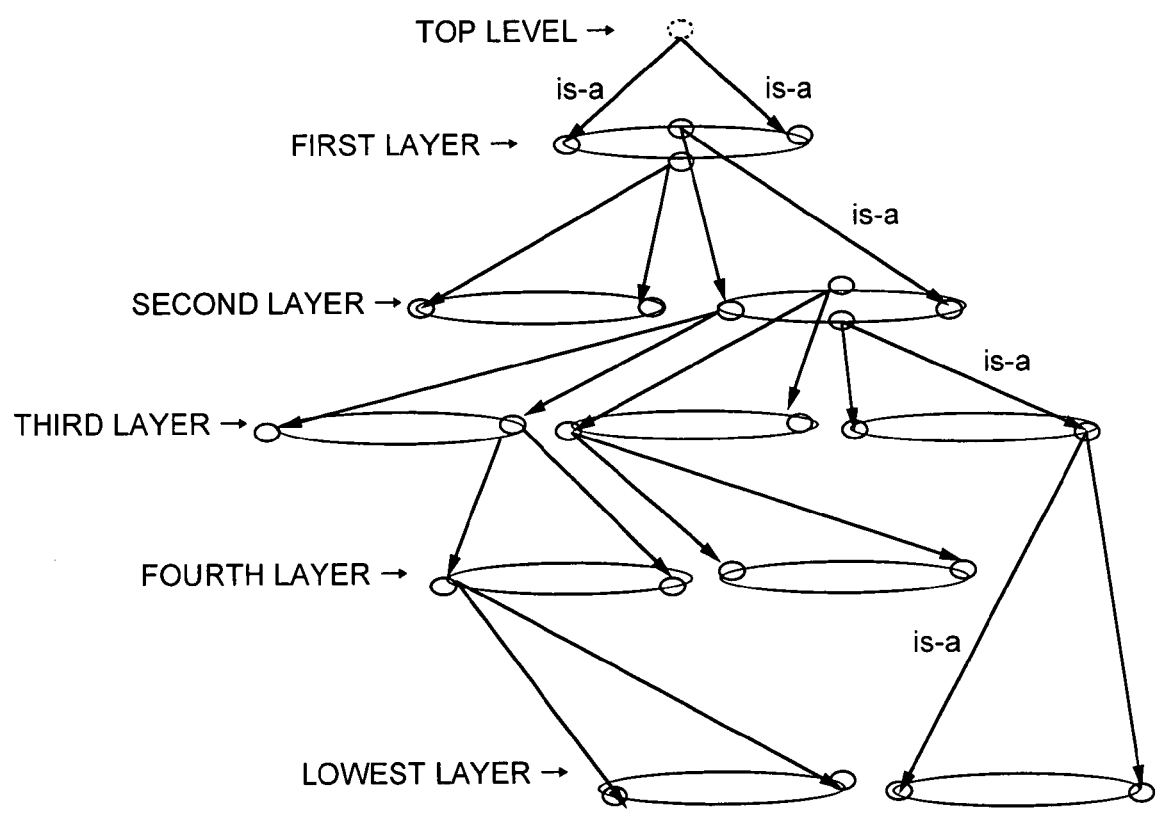
FIG. 4 is a schematic of the name space (ontology) in the system according to the embodiment.

Names are expressed in a name space (ontology) shown in FIG. 4 based on a concept system that represents vertical and subordination relationship between concepts. The top level is an item to be conceptualized (i.e., an item to be given a name). The first layer to the lowest layer have elements (i.e. names) based on the above relationship, respectively.

Figure 5:
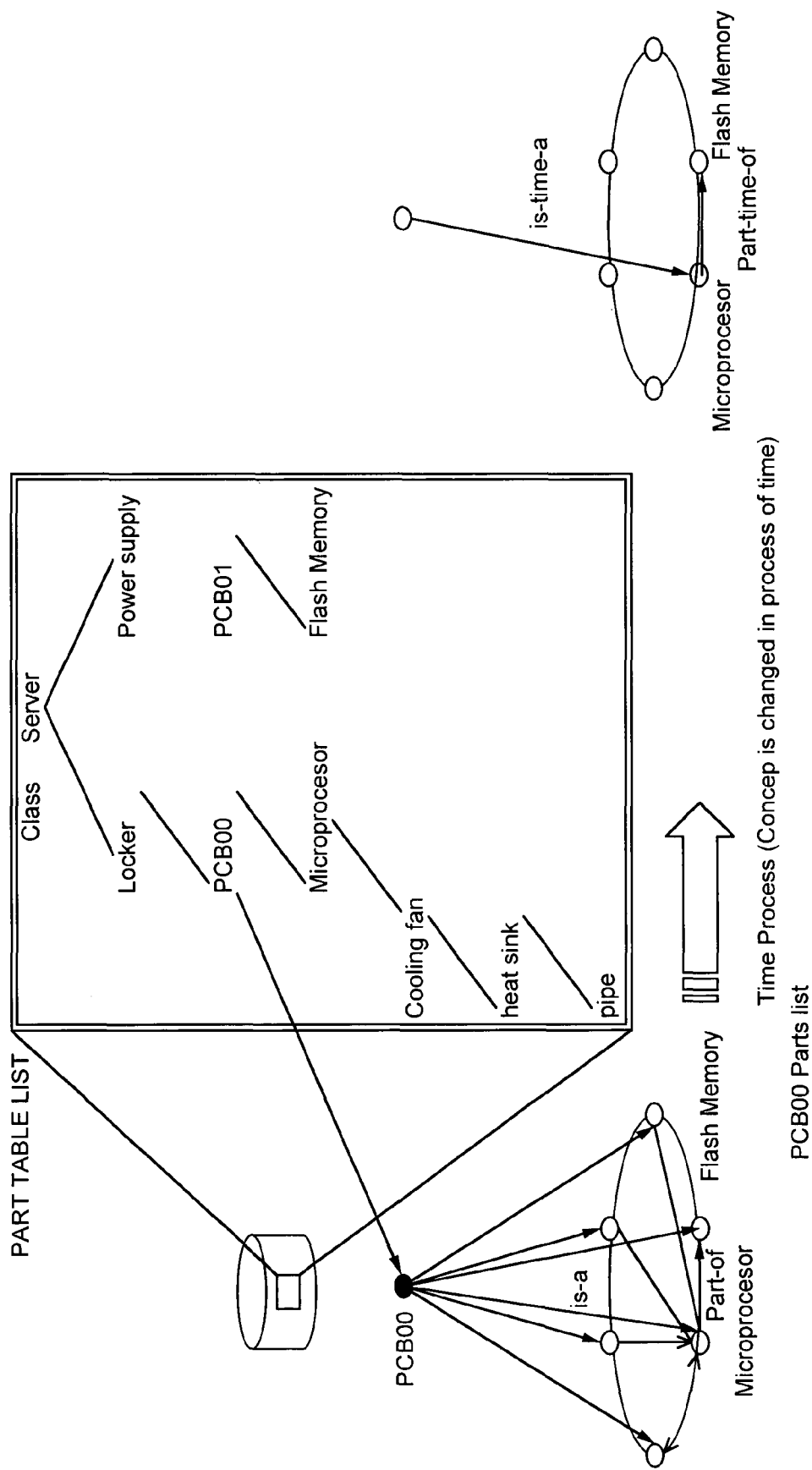
FIG. 5 illustrates the operation of the system according to the embodiment.

In the example shown in FIG. 5 the PCB00 is positioned at the top level among the part table list of the server, and the microprocessor and the flash memory are at the lower level positions, respectively.

A registration control unit 102 in FIG. 1 controls registration of information at each database. An ontology editing unit 103 has a function of editing the ontology. A name obtaining unit 104 has a function of obtaining a name candidate. An ontology generating unit 105 has a function of automatically generating the ontology (see FIG. 4) based on a method of a neural network, a fuzzy logic, or a genetic algorithm.

A search/reference processing unit 106 has a function of carrying out search/reference in response to the search/reference request from the search/reference system client 400. A multimedia information database 110 stores multimedia information (image information, video information, acoustic information, and various kinds of documents (for example, information concerning standards, design, manufacturing, purchasing, maintenance, etc.)).

A word dictionary information database 111 stores word dictionary information as candidates for names. An ontology information database 112 stores ontology information that is generated by the ontology generating unit 105. A name information database 113 stores name information that is obtained by the name obtaining unit 104.

A name space information database 114 stores name space information. An installation space information database 115 stores part table list information (see FIG. 7) corresponding to the installation space shown in FIG. 2. A schema vocabulary information database 116 stores schema vocabulary information.

The operation of the system according to the embodiment is explained below with reference to flowcharts shown in FIG. 8 to FIG. 16.

Figures 7, 8:
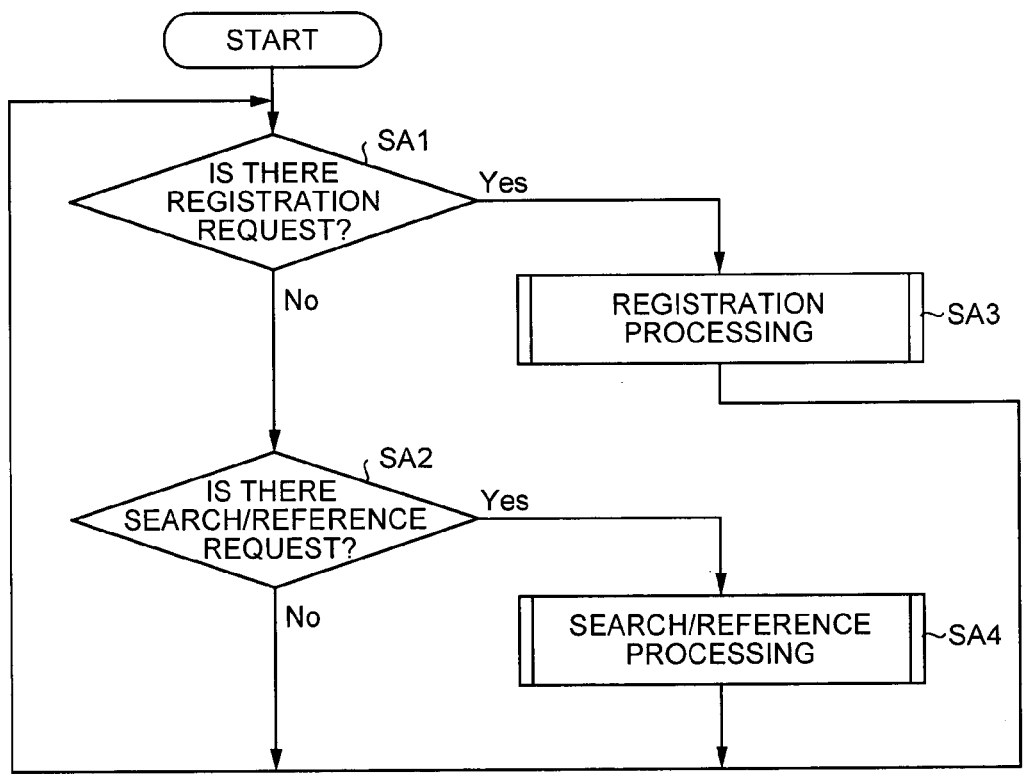
FIG. 7 illustrates part table list information according to the embodiment.
FIG. 8 is a flowchart of the operation of the system according to the embodiment.

At step SA1 shown in FIG. 8, the registration control unit 102 decides whether there is a registration request from the registration system client 300. If a result of the decision is "No," the search/reference processing unit 106 decides whether there is a search/reference request from the search/reference system client 400 at step SA2. If the result of the decision is "No," the steps SA1 and SA2 are repeated until the result of the decision becomes "Yes."

When there is a registration request from the registration system client 300, the registration control unit 102 sets "Yes" as a result of the decision at the step SA1. At step SA3, the registration processing is executed.

Figure 9:
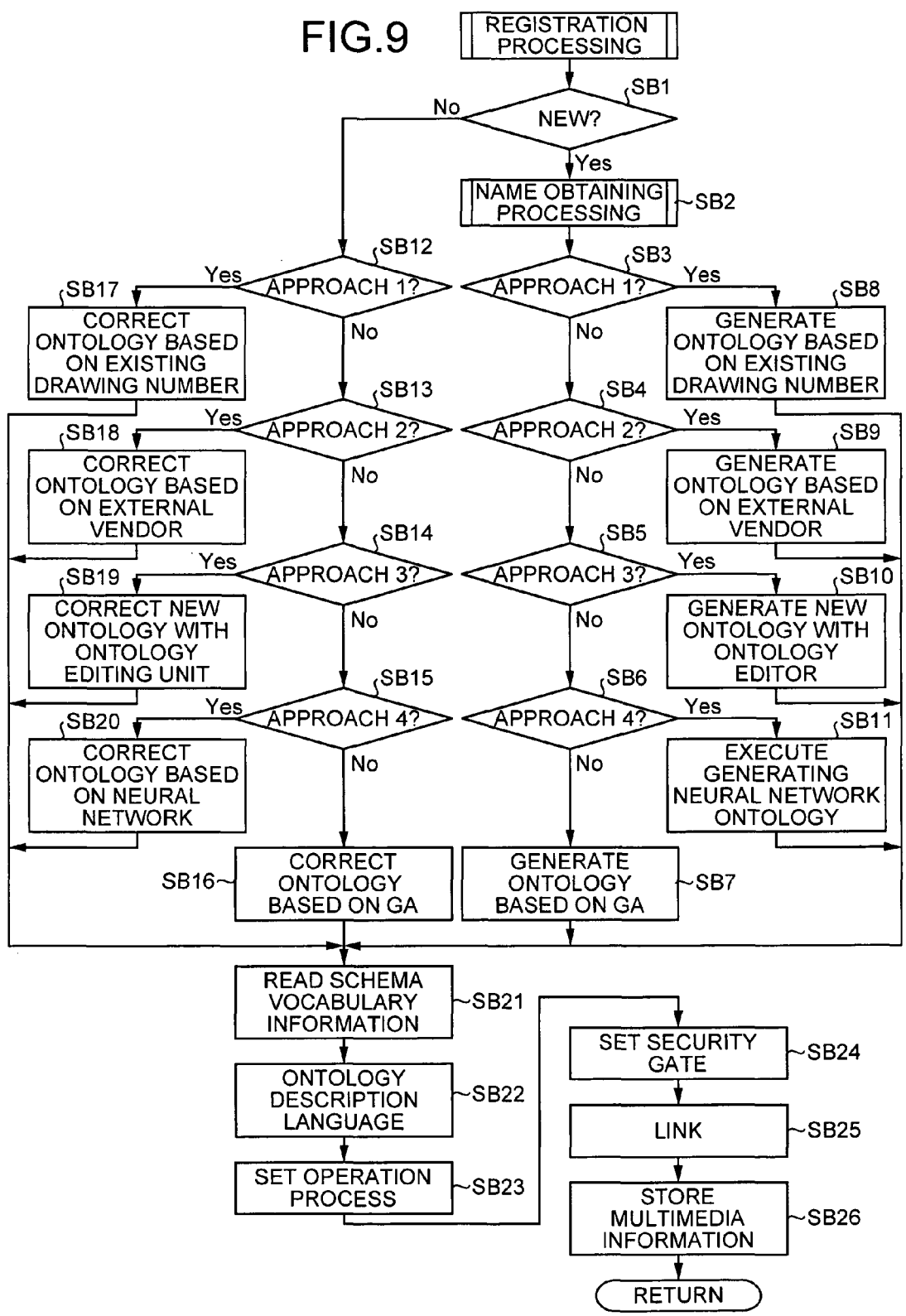
FIG. 9 is a flowchart of the registration processing shown in FIG. 8.

Specifically, at step SB1 of the flowchart shown in FIG. 9, the registration control unit 102 decides whether there is a new registration request. In this example, the registration control unit 102 sets "Yes" as a result of the decision. At step SB2, the name obtaining unit 104 executes the name obtaining processing.

Figure 10:
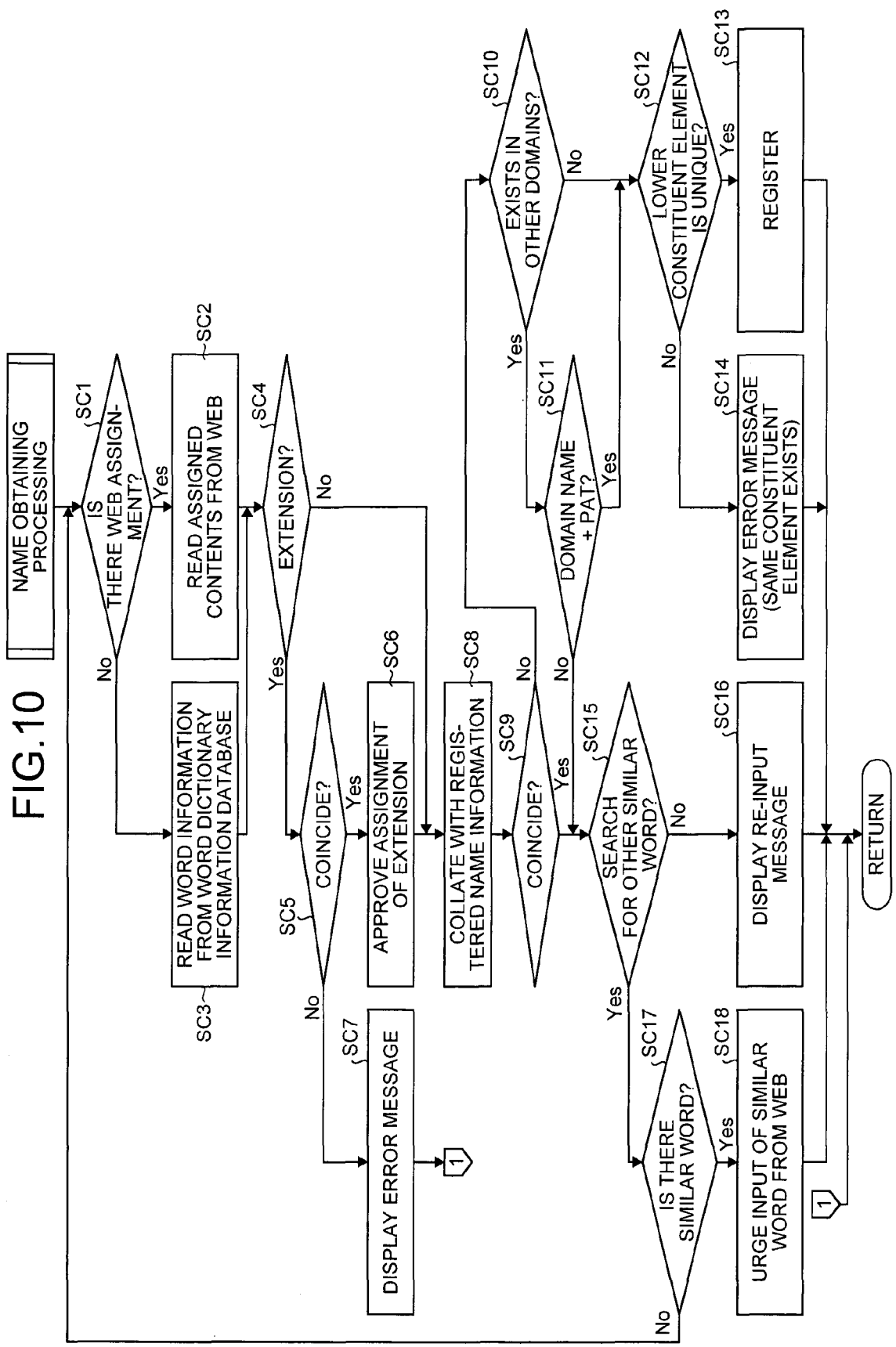
FIG. 10 is a flowchart of the name obtaining processing shown in FIG. 9.

Specifically, at step SC1 of the flowchart shown in FIG. 10, the name obtaining unit 104 decides whether reading of the name information is assigned from the web (not shown in the figure) that uses the registration system client 300.

When a result of the decision at the step SC1 is "No," the name obtaining unit 104 reads the word dictionary information (i.e., name information) from the word dictionary information database 111 at step SC3. On the other hand, when the result of the decision at the step SC1 is "Yes," the name obtaining unit 104 reads the assigned contents (i.e., name information) from the web at step SC2.

The name information that the name obtaining unit 104 reads at the step SC3 or SC2 is the development code name, the part name, and the other name within the domain (i.e., area) shown in FIG. 3. The development code name includes the FMN, the KSN, the SUN, and the UNN. The part name includes the CPN, the DVN, and the ELN.

The name information is ruled as an XML (extensible markup language) name space in the W3C (worldwide web consortium).

At step SC4, the name obtaining unit 104 decides whether an extension is assigned to the name information read at the step SC3 or SC2. The extension provides the name with extendibility, and this includes hyphen, ### (a reserved character), prefix, and suffix, etc.

When a result of the decision at the step SC4 is "Yes," the name obtaining unit 104 decides at step SC5 whether the user who assigned the extension coincides with the owner of the name information having the extension.

When a result of the decision at the step SC5 is "No," the name obtaining unit 104 makes a display unit (not shown in the figure) of the registration system client 300 display an error message at step SC7. On the other hand, when the result of the decision at the step SC5 is "Yes," the name obtaining unit 104 approves the assignment of the extension at step SC6, and executes the processing at step SC8.

When the result of the decision at the step SC4 is "No," the name obtaining unit 104 at the step SC8 collates the name information already registered in the name information database 113 with the name information read at the step SC3 SC2. At step SC9, the name obtaining unit 104 decides whether both name information coincide with each other as a result of the collation at the step SC8.

When a result of the decision at the step SC9 is "No," the name obtaining unit 104 decides at step SC10 whether the name information exists in other domains. When a result of the decision at the step SC10 is "Yes," the name obtaining unit 104 at step SC11 decides whether to use the name information by adding a domain name to the header of the DCN or the ELM (element name) shown in FIG. 3 and connecting the name information with PAT/. When a result of the decision at the step SC11 is "No," the name obtaining unit 104 makes a decision at step SC15.

On the other hand, when the result of the decision at the step SC10 is "No," or when a result of the decision at the step SC11 is "Yes," the name obtaining unit 104 at step SC12 decides whether the lower constituent element (such as a part name) of the name information is unique. In this example, the name obtaining unit 104 sets "Yes" as a result of the decision at the step SC12. At step SC13, the name obtaining unit 104 registers the name information into the name information database 113.

On the other hand, when the result of the decision at the step SC 2 is "No," the name obtaining unit 104 at step SC14 makes the display unit of the registration system client 300 display an error message (for example, "Please change the name, as there exists the same constituent element.").

When the result of the decision at the step SC9 is "Yes," or when the result of the decision at the step SC11 is "No," the name obtaining unit 104 decides at the step SC15 whether to search for other similar word. When a result of the decision at the step SC15 is "No," the name obtaining unit 104 at step SC16 makes the display unit of the registration system client 300 display a re-input message (for example, "The name already exists. Please input other name.").

On the other hand, when the result of the decision at the step SC15 is "Yes," the name obtaining unit 104 at step SC17 searches the name information database 113, and decides whether a similar word that is analogous with the input name information exists. When a result of the decision at the step SC17 is "No," the name obtaining unit 104 makes a decision at the step SC1. When the result of the decision at the step SC17 is "Yes," the name obtaining unit 104 at step SC18 urges the input of the similar word from the web.

Referring back to the step SB3 in FIG. 9, the registration control unit 102 decides whether to generate the ontology (see FIG. 4) based on an approach 1. In this example, the registration control unit 102 sets "No" as a result of the decision at the step SB3. The approach 1 is a method of using an existing drawing number or an existing article number. On the other hand, when the result of the decision at the step SB3 is "Yes," the registration control unit 102 at step SB8 generates the ontology based on the existing drawing number or the existing article number, and stores the ontology into the ontology information database 112.

At step SB4, the registration control unit 102 decides whether to generate the ontology (see FIG. 4) based on an approach 2. In this example, the registration control unit 102 sets "No" as a result of the decision at the step SB4. The approach 2 is a method of using a vendor specification provided from an external vendor or the like. When the result of the decision at the step SB4 is "Yes," the registration control unit 102 at step SB9 generates the ontology based on the vendor specification provided from the external vendor or the like, and stores the ontology into the ontology information database 112.

At step SB5, the registration control unit 102 decides whether to generate the ontology (see FIG. 4) based on an approach 3. In this example, the registration control unit 102 sets "No" as a result of the decision at the step SB5. The approach 3 is a method of using the ontology editing unit 103. When the result of the decision at the step SB5 is "Yes," the registration control unit 102 at step SB10 generates the newly prepared ontology into the ontology information database 112.

At step SB6, the registration control unit 102 decides whether to generate the ontology based on an approach 4. In this example, the registration control unit 102 sets "Yes" as a result of the decision at the step SB6. The approach 4 is a method of using a neural network.

Figure 17:
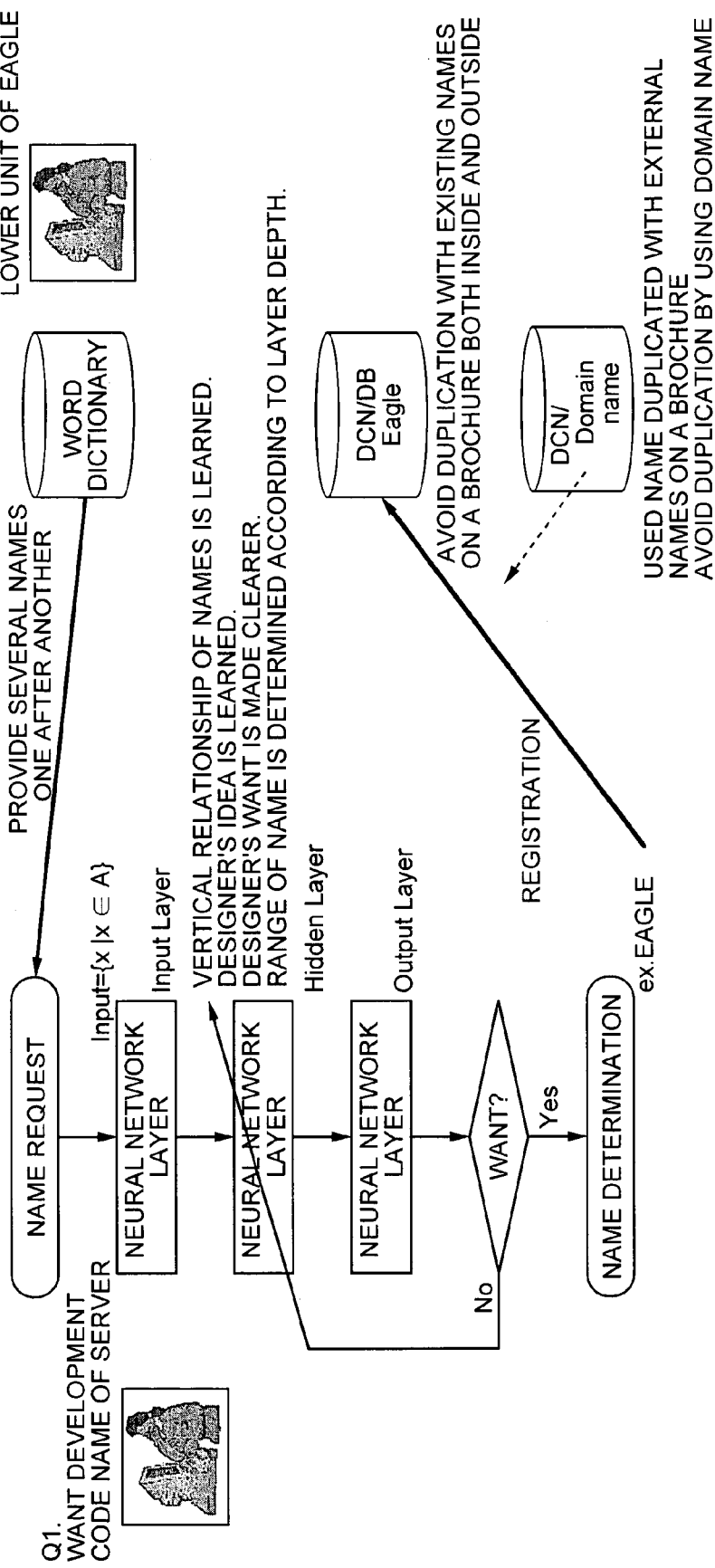
FIG. 17 illustrates the outline of the operation based on the neural network according to the embodiment.

At step SB11, the ontology generating unit 105 executes the generation of the neural network ontology As shown in FIG. 17, it is possible to apply the neural network ontology generation to any name of hardware, firmware, and software.

In the example shown in FIG. 17, the ontology generating unit 105 determines a development code name (for example, "Eagle") of the server, and determines a development code name of a lower unit of Eagle. It is possible to avoid duplication of the determined name with any other existing names on a brochure both inside and outside the company.

Figure 11:
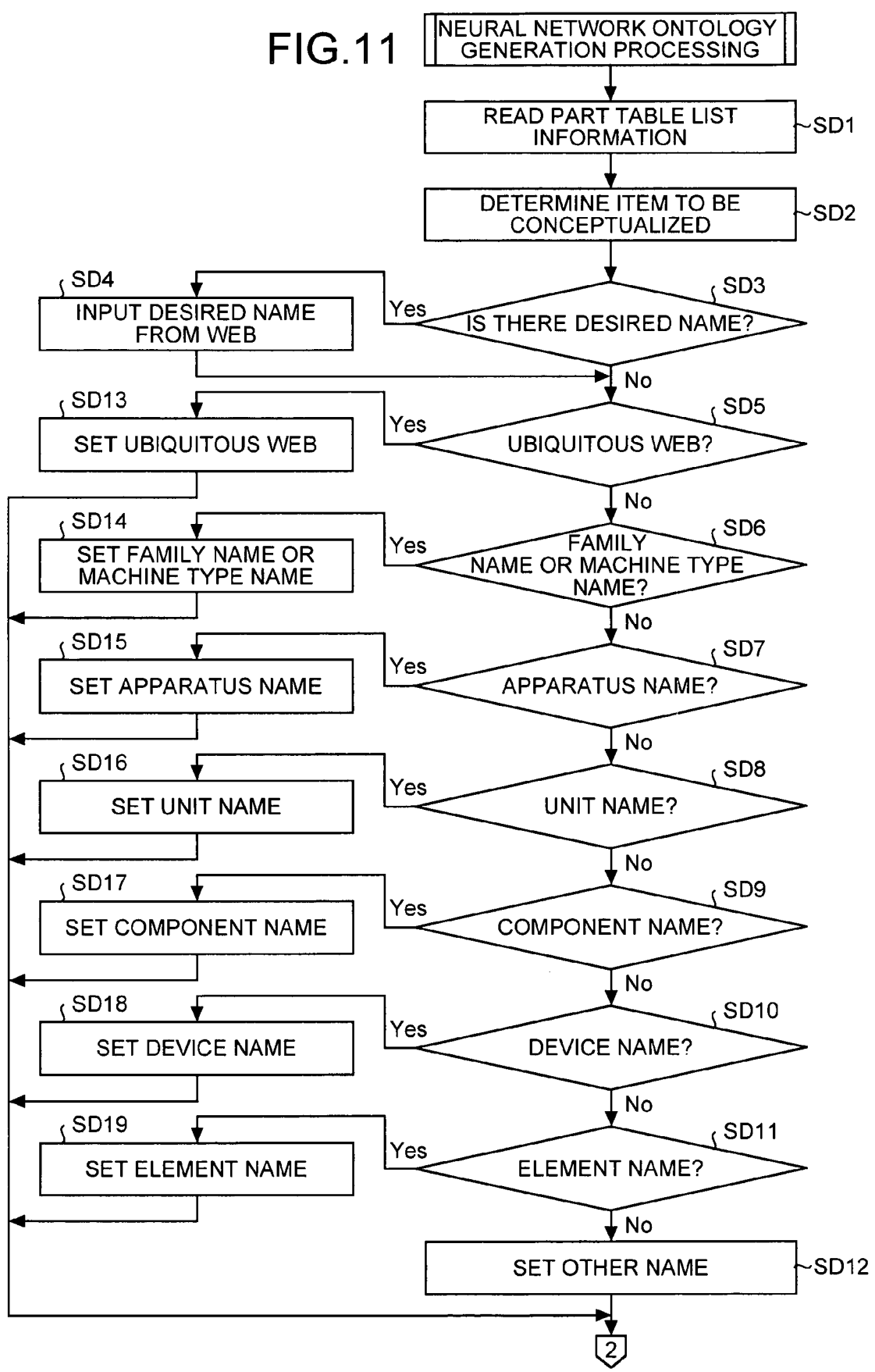
FIG. 11 is a flowchart of the neural network ontology generation processing shown in FIG. 9.

Specifically, at step SD1 in a flowchart shown in FIG. 11, the ontology generating unit 105 reads the part table list information shown in FIG. 7 from the installation space information database 115.

At step SD2, the ontology generating unit 105 determines an "apparatus name" as a name to be conceptualized, based on a user's instruction from the registration system client 300. At step SD3, the ontology generating unit 105 decides whether the desired name exists based on the user's instruction from the registration system client 300.

When a result of the decision at the step SD3 is "Yes," the ontology generating unit 105 at step SD4 makes the user input the desired name from the web using the registration system client 300. When the result of the decision at the step SD3 is "No," the ontology generating unit 105 at step SD5 decides whether the item to be conceptualized is a ubiquitous web. In this example, the ontology generating unit 105 sets "No" as a result of the decision. On the other hand, when the result of the decision at the step SD5 is "Yes," the ontology generating unit 105 at step SD13 sets the ubiquitous web to the top level of the name space (see FIG. 4).

At step SD6, the ontology generating unit 105 decides whether the item to be conceptualized is a family name or a machine type name. In this example, the ontology generating unit 105 sets "No" as a result of the decision. On the other hand, when the result of the decision at the step SD6 is "Yes," the ontology generating unit 105 at step SD14 sets the family name or the machine type name to the top level of the name space.

At step SD7, the ontology generating unit 105 decides whether the item to be conceptualized is an apparatus name. When a result of the decision at the step SD7 is "No," the ontology generating unit 105 at step SD8 decides whether the item to be conceptualized is a unit name. In this example, the ontology generating unit 105 sets "No" as a result of the decision. On the other hand, when the result of the decision at the step SD8 is "Yes," the ontology generating unit 105 at step SD16 sets the unit name to the top level of the name space.

At step SD9, the ontology generating unit 105 decides whether the item to be conceptualized is a component name. In this example, the ontology generating unit 105 sets "No" as a result of the decision. On the other hand, when the result of the decision at the step SD9 is "Yes," the ontology generating unit 105 at step SD17 sets the component name to the top level of the name space.

At step SD10, the ontology generating unit 105 decides whether the item to be conceptualized is a device name. In this example, the ontology generating unit 105 sets "No" as a result of the decision. On the other hand, when the result of the decision at the step SD10 is "Yes," the ontology generating unit 105 at step SD18 sets the device name to the top level of the name space.

At step SD11, the ontology generating unit 105 decides whether the item to be conceptualized is an element name. When a result of the decision at the step SD11 is "Yes," the ontology generating unit 105 at step SD1 9 sets the element name to the top level of the name space.

On the other hand, when the result of the decision at the step SD11 is "No," the ontology generating unit 105 at step SD12 sets other name to the top level of the name space.

In this example, the ontology generating unit 105 sets "Yes" as a result of the decision at the step SD7. At step SD15, the ontology generating unit 105 sets the apparatus name to the top level of the name space. In the flowchart shown in FIG. 12, at step SD20, the ontology generating unit 105 presents one candidate of name information to the user via the registration system client 300.

At step SD21, the ontology generating unit 105 decides whether the user likes the name information set as a candidate of the apparatus name, based on the user's operation.

When a result of the decision at the step SD21 is "No," the ontology generating unit 105 at step SD22 makes the user input the desired name from the web using the registration system client 300.

On the other hand, when the result of the decision at the step SD21 is "Yes," the ontology generating unit 105 at step SD23 allocates a group of the item to be conceptualized (the apparatus, in this case) to the name information that the user likes or to the input name information. At step SD24, the ontology generating unit 105 reads the name information of the item to be conceptualized, from the name information database 113.

At step SD25, the ontology generating unit 105 decides whether the name information read at the step SD24 is in the same group. When a result of the decision at the step SD25 is "No," the ontology generating unit 105 makes a decision at step SD17. On the other hand, when the result of the decision at the step SD25 is "Yes," the ontology generating unit 105 at step SD26 gives the same group ID to the name information.

At step SD27, the ontology generating unit 105 decides whether the presentation of the name information candidate at the step SD20 has all ended. In this example, the ontology generating unit 105 sets "No" as a result of the decision at the step SD27, and executes the processing at the step SD20. Thereafter, the ontology generating unit 105 repeats the processing at the step SD20 to SD27, thereby to determine a candidate of the name information in the group.

Figure 18:
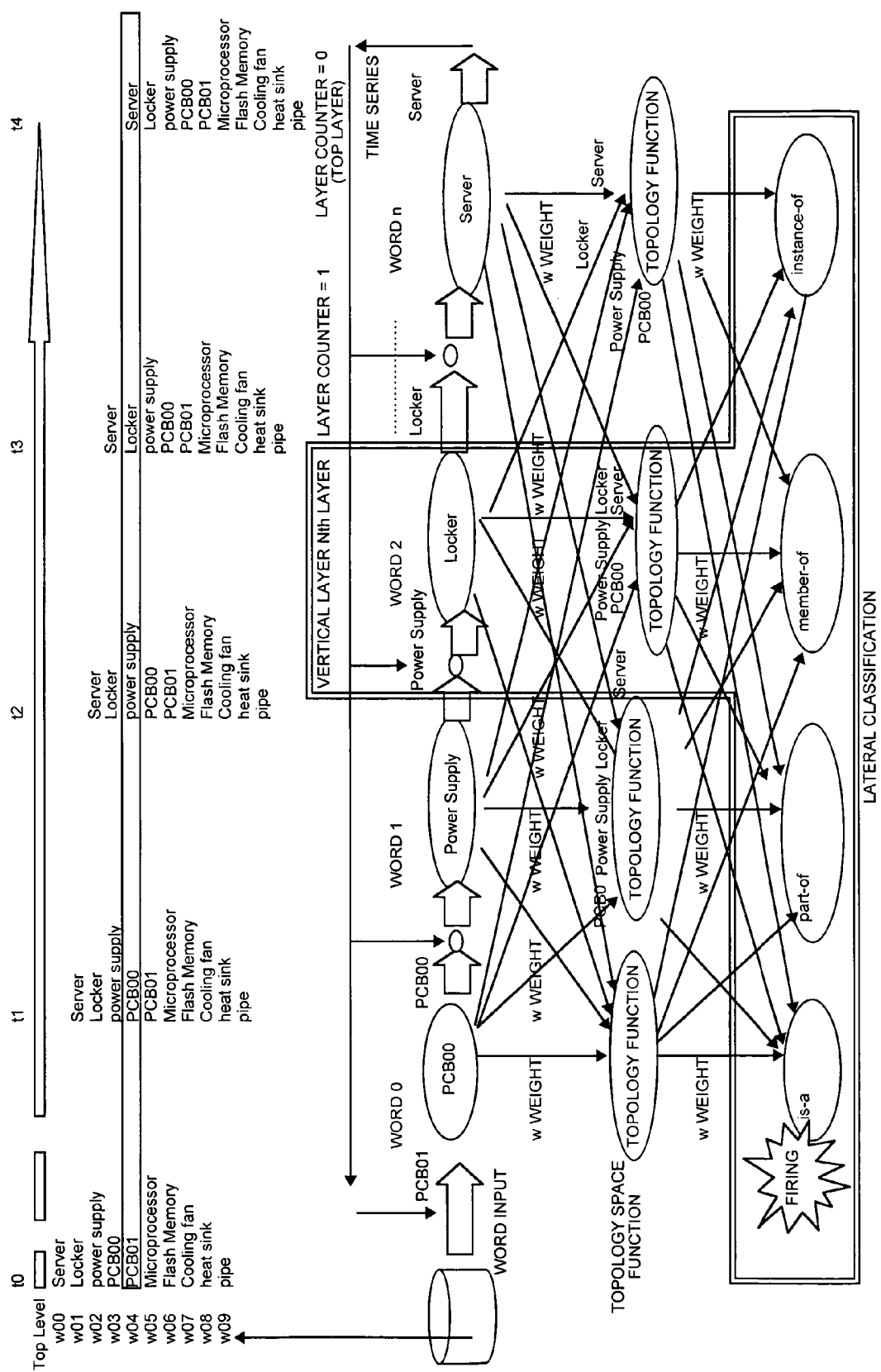
FIG. 18 is a schematic of the neural network according to the embodiment.

When the result of the decision at the step SD27 is "Yes," the ontology generating unit 105 at step SD28 executes the layer depth determination processing to determine the layer depth of the name space (ontology) generated based on the candidates of the name information, in the neural network (see FIG. 18).

Figure 13:
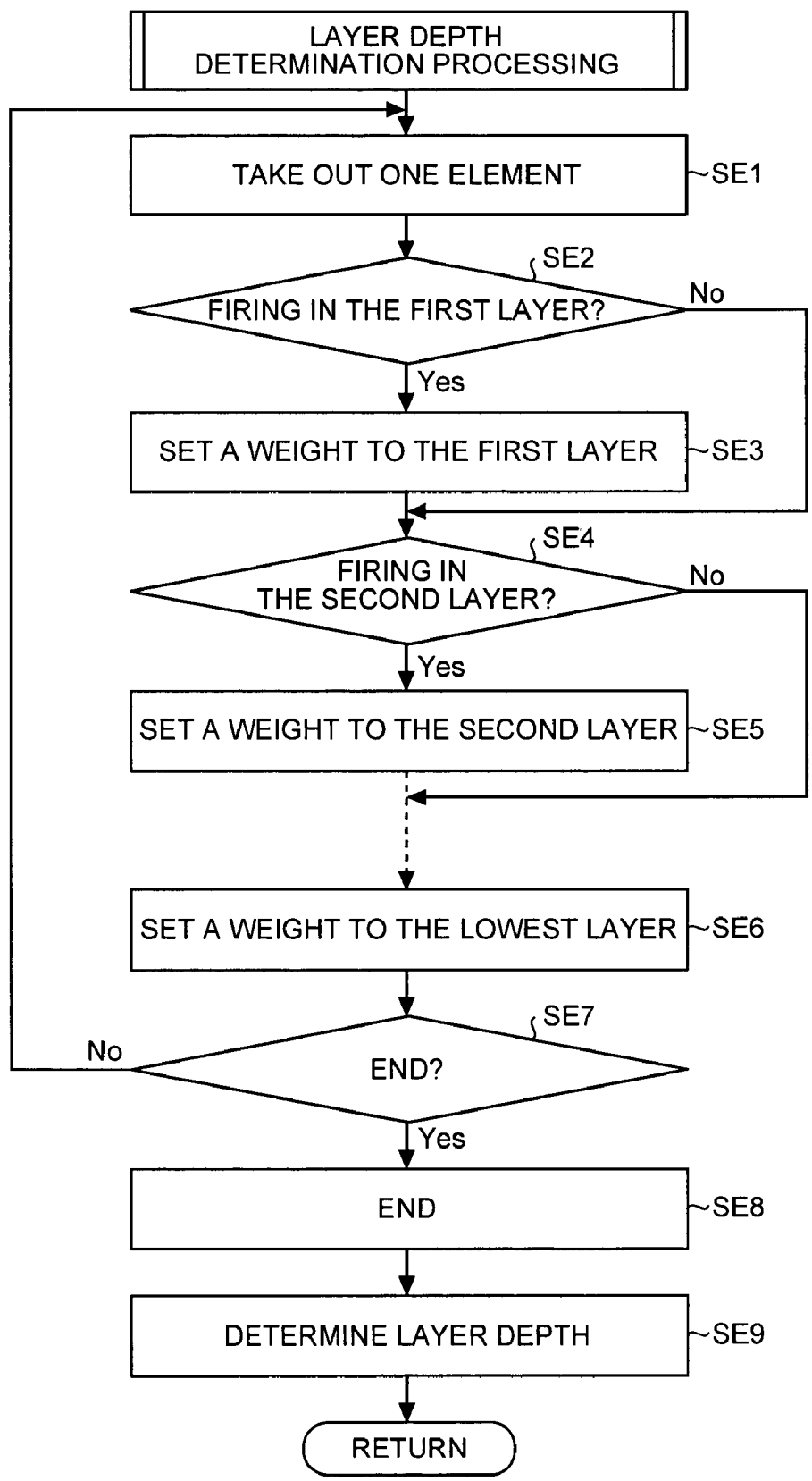
FIG. 13 is a flowchart of the layer depth determination processing shown in FIG. 12.
Figure 14:
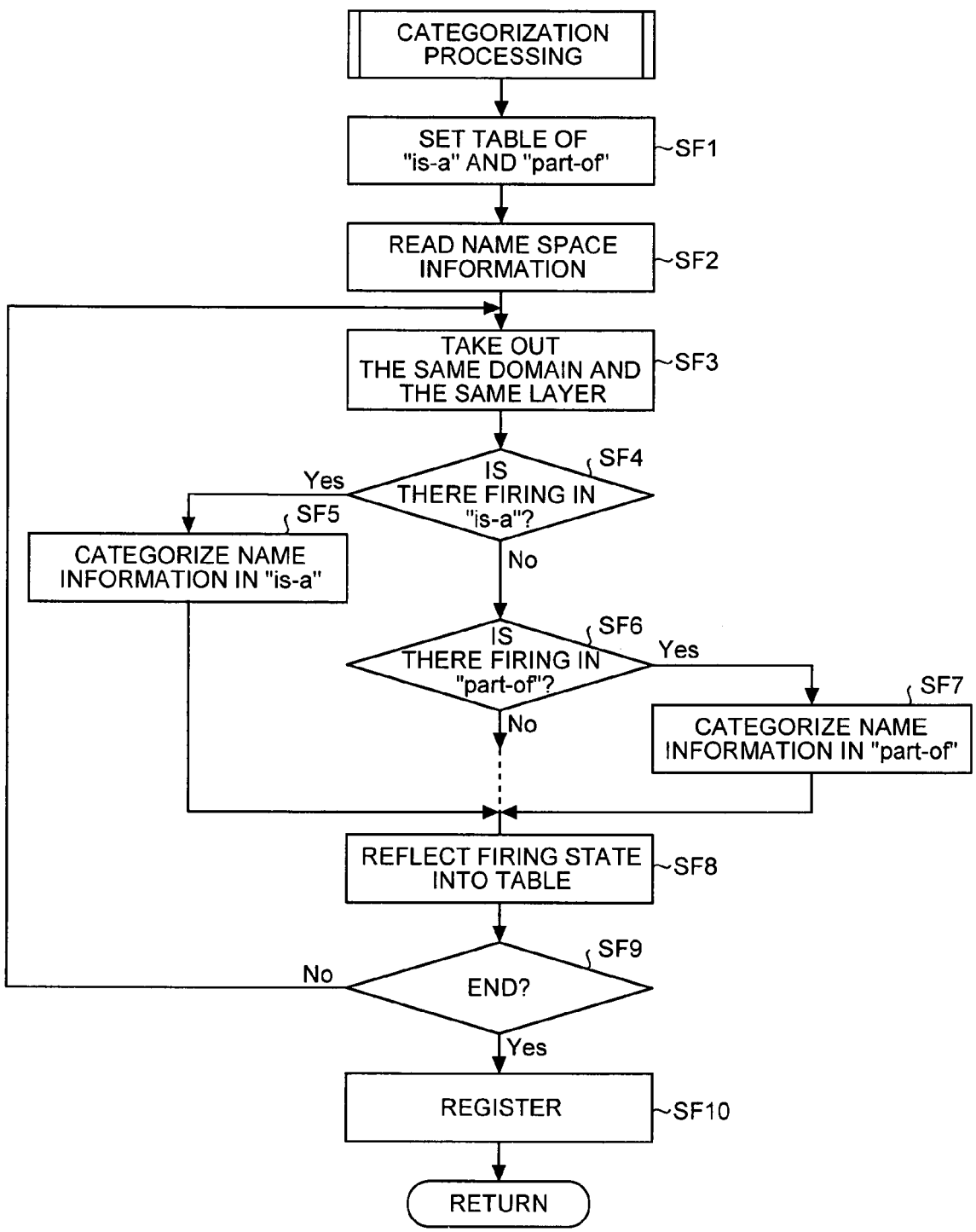
FIG. 14 is a flowchart of the categorizing processing shown in FIG. 12.

Specifically, at step SE1 in a flowchart shown in FIG. 13, the ontology generating unit 105 takes out one piece of name information as an element of the group. At step SE2, the ontology generating unit 105 decides whether there is a firing in the first layer of the name space (ontology) shown in FIG. 4. When a result of the decision at the step SE2 is "Yes," the ontology generating unit 105 at step SE3 sets a weight to the first layer When the result of the decision at the step SE2 is "No," the ontology generating unit 105 at step SE4 decides whether there is a firing in the second layer shown in FIG. 4. When a result of the decision at the step SE4 is "Yes," the ontology generating unit 105 at step SE5 sets a weight to the second layer.

Thereafter, the ontology generating unit 105 executes the processing at the steps SE2 and SE3 for the third layer afterward. At step SE6, the ontology generating unit 105 sets a weight to the lowest layer. At step SE7, the ontology generating unit 105 decides whether the taking out of the elements (i.e., name information) from the group is completed. In this example, the ontology generating unit 105 sets "No" as a result of the decision at the step SE7, and executes the processing at the step SE1 afterward.

When the result of the decision at the step SE7 is "Yes," the ontology generating unit 105 at step SE8 ends the learning based on the neural network. At step SE9, the ontology generating unit 105 determines the depth of the largest layer among the layers in which there is a firing, and stores the name space information of the hierarchical structure shown in FIG. 4 into the name space information database 114.

Figure 12:
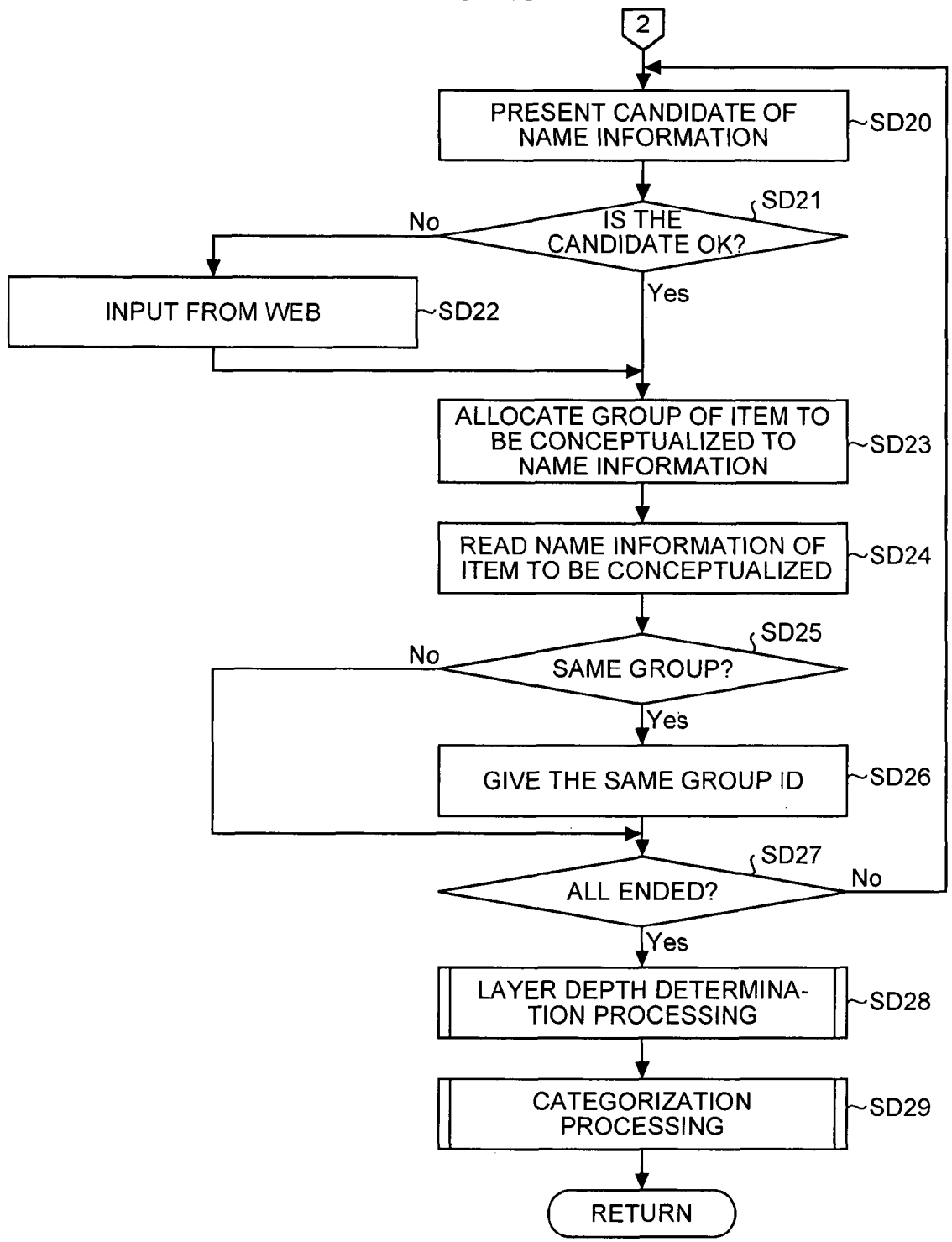
FIG. 12 is a flowchart of the neural network ontology generation processing shown in FIG. 9.

Referring back to step SD29 in FIG. 12, the ontology generating unit 105 executes the categorization processing to categorize the name information (concept). Specifically, at step SF1 in the flowchart shown in FIG. 14, the ontology generating unit 105 sets a table of "is-a" and "Part-of" that show mutual relationship of the concept. The "is-a" means that the concept expressed by two pieces of name information in the name space (see FIG. 3, FIG. 5, and FIG. 6) is in the lateral relationship. The "Part-of" means that the concept expressed by two pieces of name information is in the vertical relationship.

At step SF2, the ontology generating unit 105 reads the name space information (see FIG. 4) from the name space information database 114. At step SF3, the ontology generating unit 105 takes out pieces of name information that belong to the same domain and the same layer, from the name space shown in FIG. 4.

At step SF4, the ontology generating unit 105 decides whether there is a firing in the "is-a" in the neural network. When a result of the decision at the step SF4 is "Yes," the ontology generating unit 105 at step SF5 categorizes the name information in the "is-a."

On the other hand, when the result of the decision at the step SF4 is "No," the ontology generating unit 105 at step SF6 decides whether there is a firing in the "Part-of" in the neural network. When a result of the decision at the step SF6 is "Yes," the ontology generating unit 105 at step SF7 categorizes the name information in the "Part-of." At step SF8, the ontology generating unit 105 reflects the firing state into the table.

Figure 19:
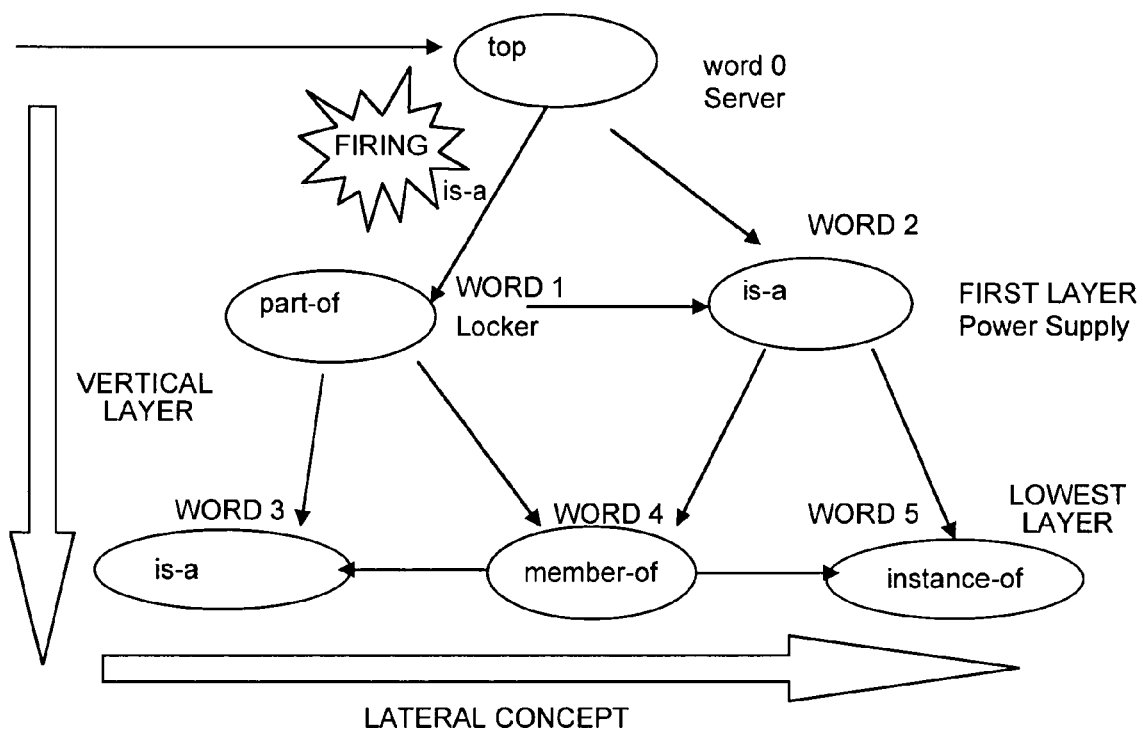
FIG. 19 is a schematic of the neural network according to the embodiment.

At step SF9, the ontology generating unit 105 decides whether the processing of all the name information has ended in the name space information from the name space information database 114. In this example, the ontology generating unit 105 sets "No" as a result of the decision at the step SF9. Thereafter, the ontology generating unit 105 repeats the processing at the steps SF3 to SF9, thereby to form a meaning network (for example, a network as shown in FIG. 19) of the name information.

When the result of the decision at the step SF9 is "Yes," the ontology generating unit 105 at step SF10 registers the categorized ontology shown in FIG. 4 into the ontology information database 112.

At step SB21 of the flowchart shown in FIG. 9, the registration control unit 102 reads the schema vocabulary information from the schema vocabulary information database 116. At step SB22, the registration control unit 102 describes the ontology information stored in the ontology information database 112, in the ontology description language (based on the resource description framework (RDF)), and registers this ontology information into the ontology information database 112.

Figure 20:
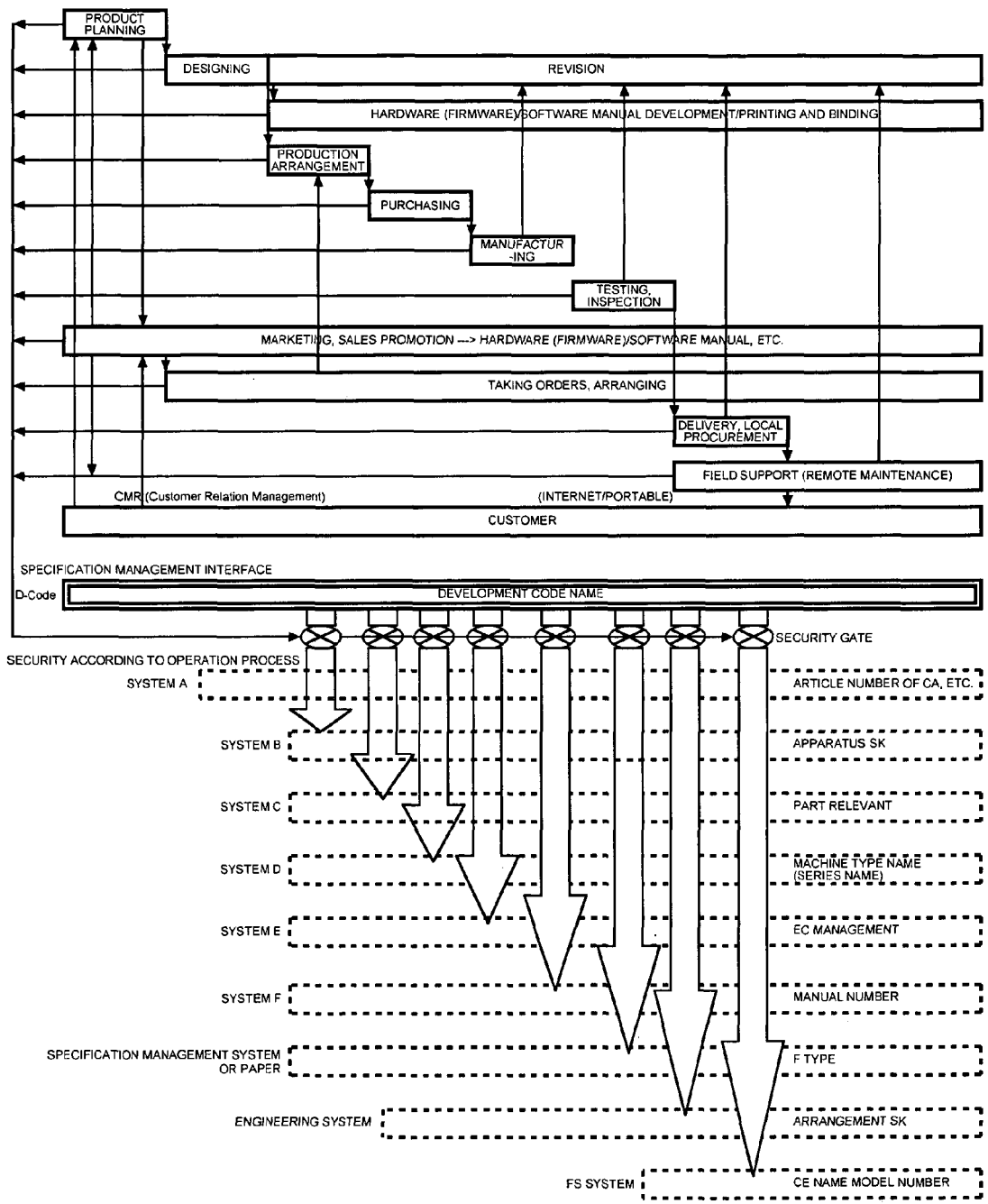
FIG. 20 is a schematic of the security gateway for each operation process according to the embodiment.

At step SB23, the registration control unit 102 sets the operation process shown in FIG. 20. The operation process is a series of process that includes product planning, designing, hardware (firmware)/software/manual development/printing and binding, production arrangement, purchasing, manufacturing, testing, inspection, marketing, sales promotion, taking orders, arranging, delivery, local procurement, and field support.

Figure 6:
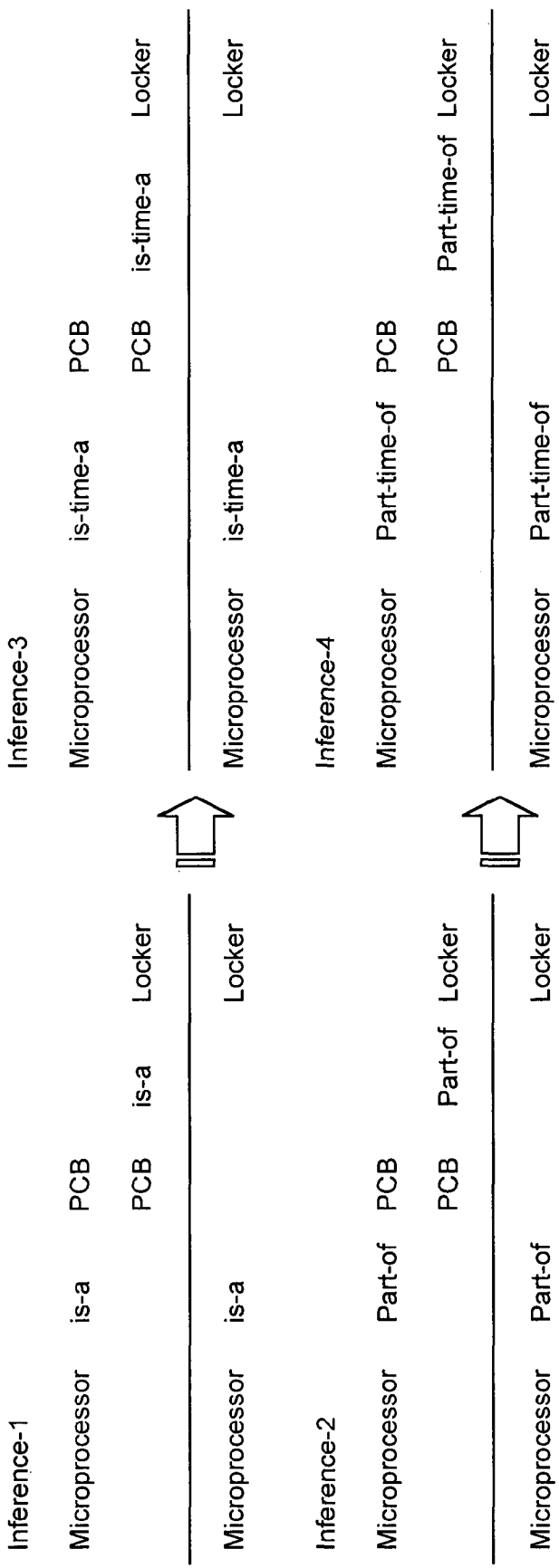
FIG. 6 illustrates the operation of the system according to the embodiment.

In each step of the operation process, names generated based on the above method (a development code, for example) are used. FIG. 5 and FIG. 6 illustrate examples of the operation process being used.

At step SB24 of the flowchart shown in FIG. 9, the registration control unit 102 sets a security gate as shown in FIG. 20 to each step of the operation process. This security gate limits a range of names that can be searched for/referred to, depending on the step of the operation process.

Figure 21:
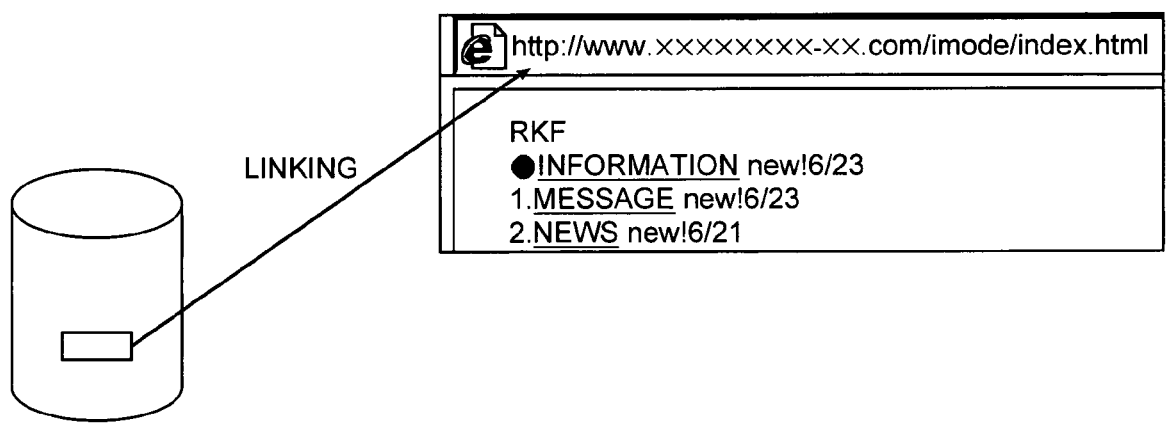
FIG. 21 illustrates the linking operation according to the embodiment.

At step SB25, as shown in FIG. 21, the registration control unit 102 links each element (name) of the name space (ontology) shown in FIG. 4 with a corresponding piece of the multimedia information (i.e., image information, video information, acoustic information, and various kinds of documents (for example, information concerning standards, design, manufacturing, purchasing, maintenance, etc.)). At step SB26, the registration control unit 102 stores the multimedia information linked with the names, into the multimedia information database 110.

When a result of the decision at the step SB6 shown in FIG. 9 is "No," the registration control unit 102 generates the ontology based on a genetic algorithm (GA). When a result of the decision at step SB1 is "No," that is, when it is necessary to correct the ontology, the registration control unit 102 at step SB12 decides whether to correct the ontology (see FIG. 4) generated based on the approach 1. In this example, the registration control unit 102 sets "No" as a result of the decision at the step SB12.

On the other hand, when the result of the decision at the step SB1 2 is "Yes," the registration control unit 102 at step SB17 corrects the ontology based on the existing drawing number or the existing article number.

At step SB13, the registration control unit 102 decides whether to correct the ontology (see FIG. 4) generated based on the approach 2. In this example, the registration control unit 102 sets "No" as a result of the decision at the step SB13. On the other hand, when the result of the decision at the step SB13 is "yes," the registration control unit 102 at step SB18 corrects the ontology based on the vendor specification provided from the external vendor or the like.

At step SB14, the registration control unit 102 decides whether to correct the ontology (see FIG. 4) generated based on the approach 3. In this example, the registration control unit 102 sets "No" as a result of the decision at the step SB14. On the other hand, when the result of the decision at the step SB14 is "yes," the registration control unit 102 at step SB19 corrects the ontology.

At step SB15, the registration control unit 102 decides whether to correct the ontology generated based on the approach 4. In this example, the registration control unit 102 sets "No" as a result of the decision at the step SB15. On the other hand, when the result of the decision at the step SB15 is "Yes," the registration control unit 102 at step SB20 corrects the ontology based on the neural network. At step SB16, the registration control unit 102 corrects the ontology generated at step SB7, based on the genetic algorithm.

When the search/reference system client 400 makes a search/reference request, the search/reference processing unit 106 sets "Yes" as a result of the decision at the step SA2 shown in FIG. 8. At step SA4, the search/reference processing unit 106 carries out the search/reference processing.

Figure 15:
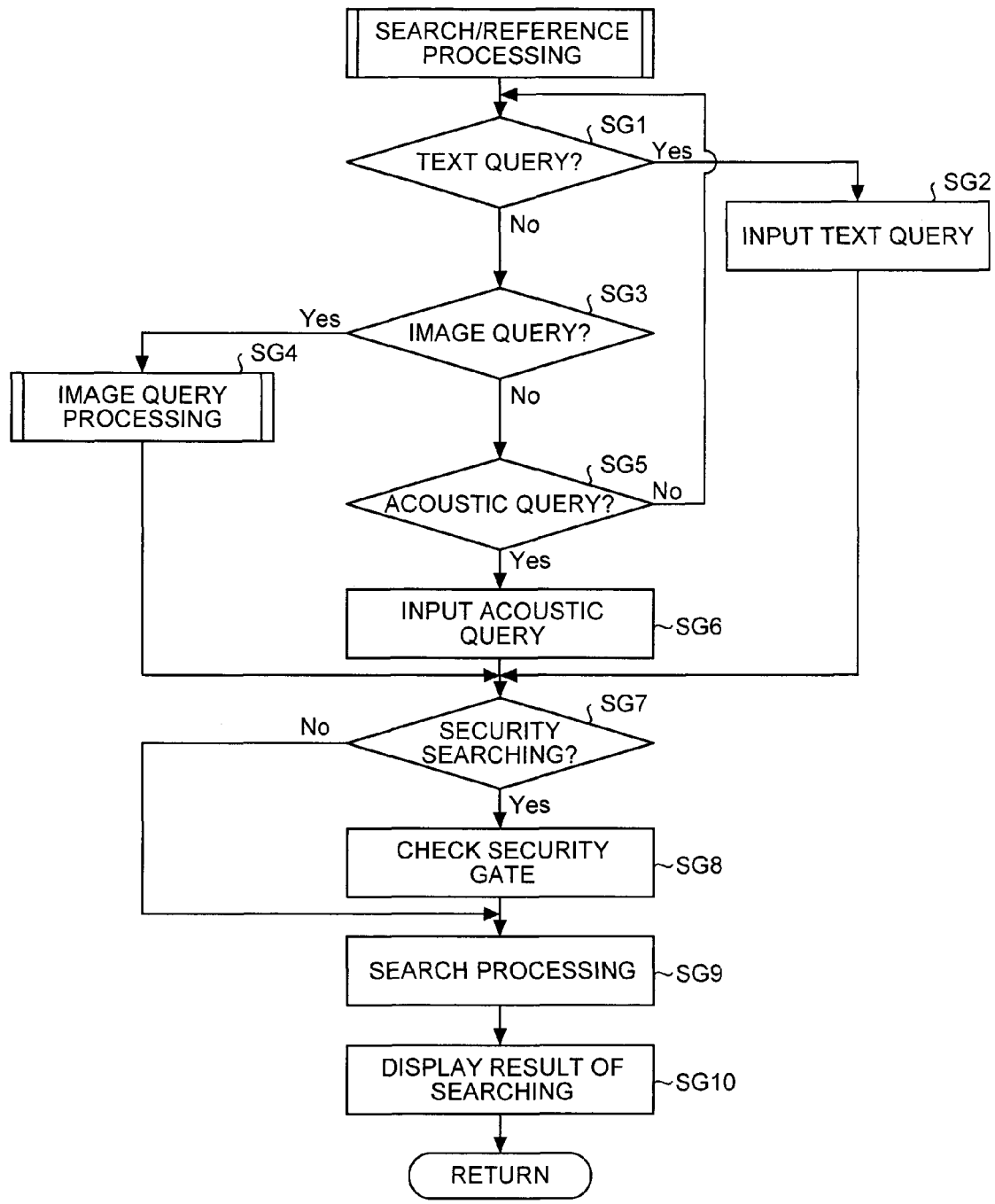
FIG. 15 is a flowchart of the search/reference processing shown in FIG. 8.
Figure 16:
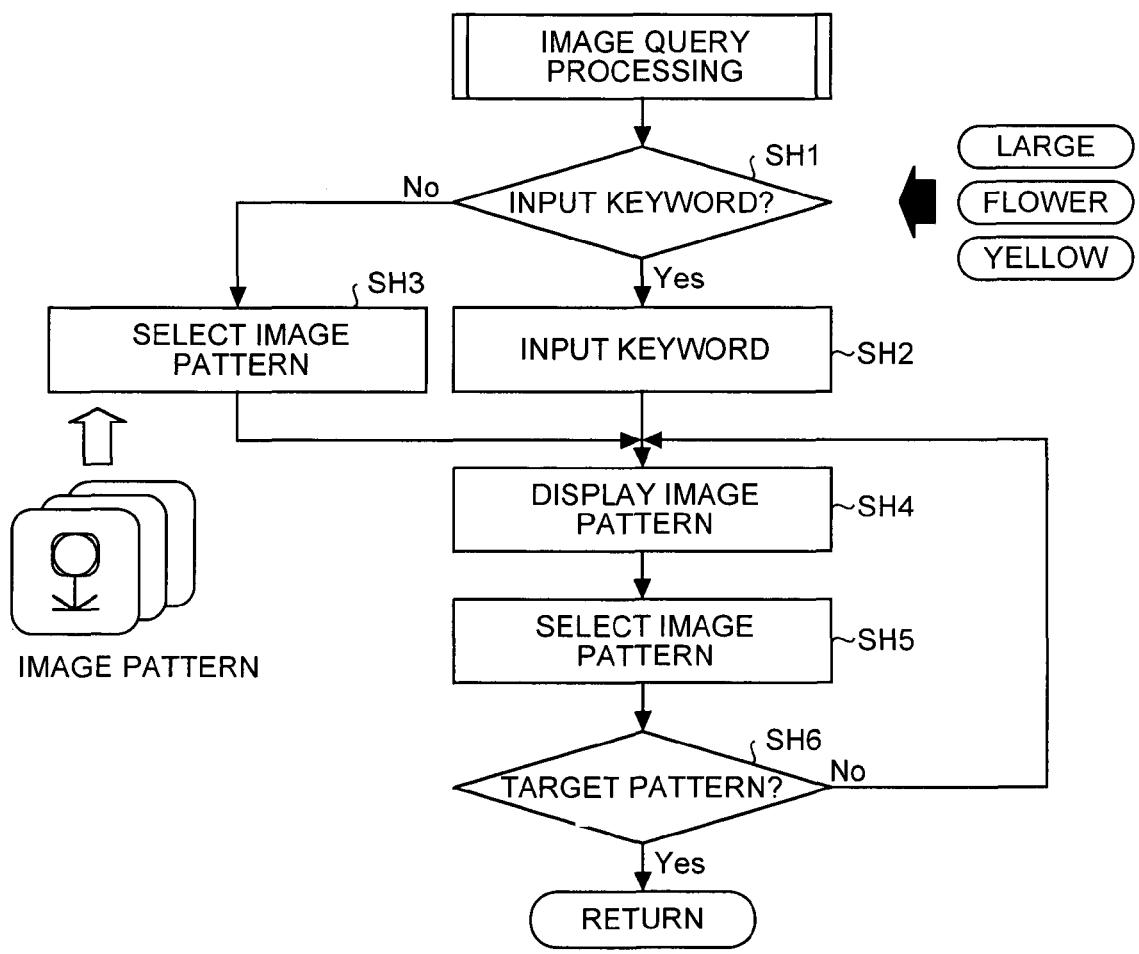
FIG. 16 is a flowchart of the image query processing shown in FIG. 12.

Specifically, at step SG1 in the flowchart shown in FIG. 15, the search/reference processing unit 106 decides whether to use a text query as a search key. When a result of the decision at the step SG1 is "Yes," the search/reference processing unit 106 at step SG2 makes the search/reference system client 400 input the text query.

At step SG7, the search/reference processing unit 106 decides whether to carry out the security search based on the security gate explained with reference to FIG. 20. In this example, the search/reference processing unit 106 sets "Yes" as a result of the decision at the step SG7. When the result of the decision at the step SG7 is "No," the search/reference processing unit 106 execute the processing at step SG9.

At step SG8, the search/reference processing unit 106 checks the security gate (see FIG. 20) based on the operation process corresponding to the searcher of the search/reference system client 400.

At step SG9, the search/reference processing unit 106 searches the multimedia information database 110 for multimedia information based on the search key (the text query in this example), and retrieves the name linked with the multimedia information from the ontology information database 112.

The search/reference processing unit 106 checks whether the result of the search is limited by the security gate. When the result of the search is limited by the security gate, the search/reference processing unit 106 decides that there is no result of the search. At step SG10, the search/reference processing unit 106 makes the display unit of the search/reference system client 400 display the result of the search (i.e., multimedia information and name).

On the other hand, when the result of the decision at the step SG1 is "No," the search/reference processing unit 106 at step SG3 decides whether to use an image query as a search key. In this example, the search/reference processing unit 106 sets "No" as a result of the decision at the step SG3.

At step SG5, the search/reference processing unit 106 decides whether to use an acoustic query as a search key. When a result of the decision at the step SG5 is "No," the search/reference processing unit 106 makes a decision at the step SG1

When the result of the decision at the step SG5 is "Yes," the search/reference processing unit 106 at step SG6 makes the search/reference system client 400 input the acoustic query.

At the step SG7, the search/reference processing unit 106 decides whether to carry out the security search as described above. In this example, the search/reference processing unit 106 sets "Yes" as a result of the decision at the step SG7.

At the step SG8, the search/reference processing unit 106 checks the security gate based on the operation process corresponding to the searcher of the search/reference system client 400.

At the step SG9, the search/reference processing unit 106 searches the multimedia information database 110 for multimedia information based on the search key (the acoustic query in this example), and retrieves the name linked with the multimedia information from the ontology information database 112.

The search/reference processing unit 106 checks whether the result of the search is limited by the security gate. When the result of the search is limited by the security gate, the search/reference processing unit 106 at the step SG10 makes the display unit of the search/reference system client 400 display the result of the search (i.e., multimedia information and name).

On the other hand, when the result of the decision at the step SG3 is "Yes," the search/reference processing unit 106 at step SG4 executes the image query processing. Specifically, at step SH1 in the flowchart shown in FIG. 16, the search/reference processing unit 106 decides whether to input a keyword as a search key. In this example, the search/reference processing unit 106 sets "Yes" as a result of the decision at the step SH1. At step SH2, the search/reference processing unit 106 makes the search/reference system client 400 input a keyword (for example, a large yellow flower) corresponding to the image query.

On the other hand, when the result of the decision at the step SH1 is "No," the search/reference processing unit 106 at step SH3 makes the search/reference system client 400 display a plurality of image patterns as search key candidates, and makes the search/reference system client 400 select one candidate.

At step SH4, the search/reference processing unit 106 makes the search/reference system client 400 display the image patterns corresponding to the step SH3 or SH2. At step SH5, the search/reference processing unit 106 makes the search/reference system client 400 select an image pattern. At step SH6, the search/reference processing unit 106 decides whether the image pattern selected at the step SH5 is a target pattern.

When a result of the decision at the step SH6 is "No," the search/reference processing unit 106 executes the processing at the step SH4 afterward. When the result of the decision at the step SH6 is "Yes," at step SG7 of the flowchart shown in FIG. 15, the search/reference processing unit 106 decides whether to carry out the security search. In this example, the search/reference processing unit 106 sets "Yes" as a result of the decision at the step SG7.

At step SG8, the search/reference processing unit 106 checks the security gate based on the operation process corresponding to the searcher of the search/reference system client 400.

At step SG9, the search/reference processing unit 106 searches the multimedia information database 110 for multimedia information based on the search key (in this example, the image pattern that is set as the target pattern at the step SH6), and retrieves the name linked with the multimedia information from the ontology information database 112.

The search/reference processing unit 106 checks whether the result of the search is limited by the security gate. When the result of the search is limited by the security gate, the search/reference processing unit 106 decides that there is no result of the search. At step SG10, the search/reference processing unit 106 makes the display unit of the search/reference system client 400 display the result of the search (i.e., multimedia information and name).

As explained above, according to the present embodiment, the system generates the ontology (see FIG. 4) as a group of name candidates, with an element set in the installation space (see FIG. 2) as a top level (see FIG. 4) based on the name information obtained in advance. The system links each name that constitutes this ontology with the multimedia information. Therefore, it is possible to improve the efficiency of managing names and multimedia information.

According to the present embodiment, the system generates the ontology according to the element that is set to the top level of the name space (see FIG. 4). Therefore, it is possible to change the ontology to be generated according to the element.

According to the present embodiment, the user selects whether the name based on the generated ontology is to be used as it is. Therefore, it is possible to reflect user's idea in naming.

According to the present embodiment, the system collates name information already obtained, thereby to check duplication of names, at the time of obtaining name information. Therefore, it is possible to avoid wasteful naming, and it is possible to further improve the management efficiency.

According to the present embodiment, the system checks duplication of names within the domain to which the name information belongs. Therefore, it is possible to use duplicated names between other domains.

According to the present embodiment, the system obtains name information having an extension equipped with extension function. Therefore, it is possible to increase extendibility of naming.

According to the present embodiment, the system sets the security gate that limits a range of names that can be searched for/referred to, according to the environment in which the name is used (i.e., the operation process), as shown in FIG. 20. Therefore, it is possible to increase the security level.

According to the present embodiment, the system executes the search for a name corresponding to the ontology, and multimedia information that is linked with the name, in the search/reference processing. The system outputs a result of the search corresponding to the security gate shown in FIG. 20. Therefore, there is an effect that it is possible to improve the efficiency of search for names and multimedia information.

Figure 23:
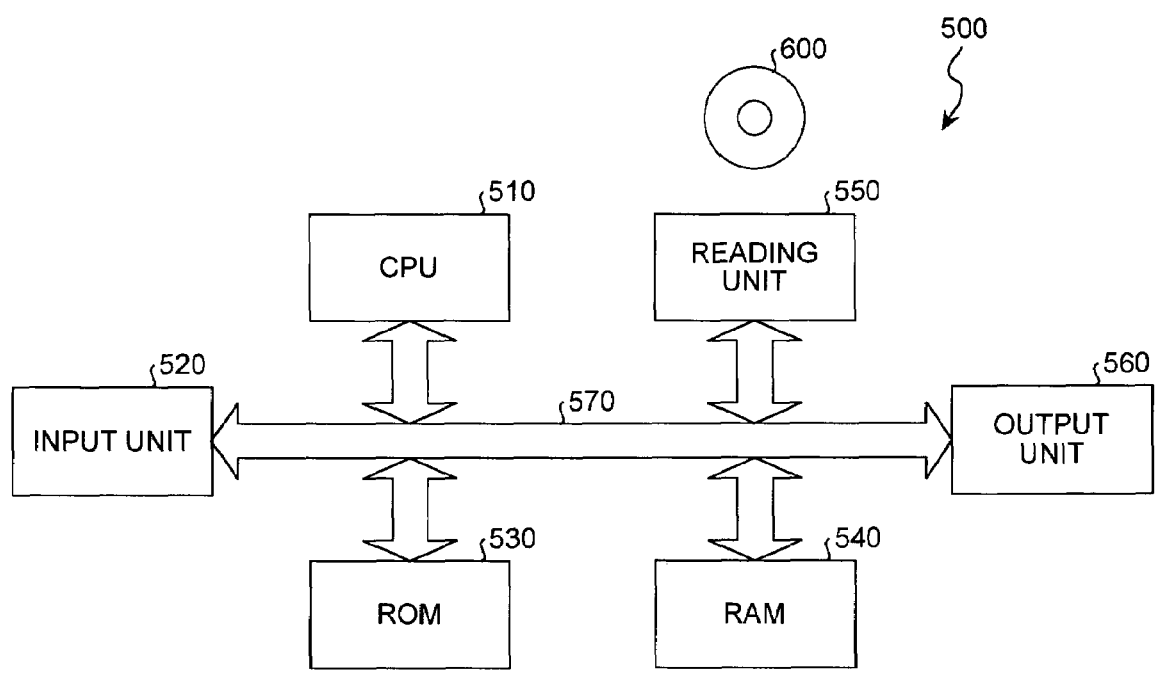
FIG. 23 is a block diagram representing the structure of a system according to a modified embodiment.

A computer program for realizing the functions of the multimedia processing apparatus 100 may be recorded onto a computer-readable recording medium 600 shown in FIG. 23. A computer 500 shown in FIG. 23 reads the program recorded on the recording medium 600, and executes the program to realize the functions.

The computer 500 includes a central processing unit (CPU) 510 that executes the program, an input unit 520 such as a keyboard and a mouse, a read-only memory (ROM) 530 that stores various kinds of data, a random-access memory (RAM) 540 that stores operation parameters and the like, a reading unit 550 that reads the program from the recording medium 600, an output unit 560 such as a display and a printer, and a bus 570 that connects between the units of the apparatus.

The CPU 510 reads the program recorded on the recording medium 600 via the reading unit 550, and executes the program, thereby to realize the functions. The recording medium 600 includes an optical disk, a flexible disk, and a hard disk.

Figure 22:
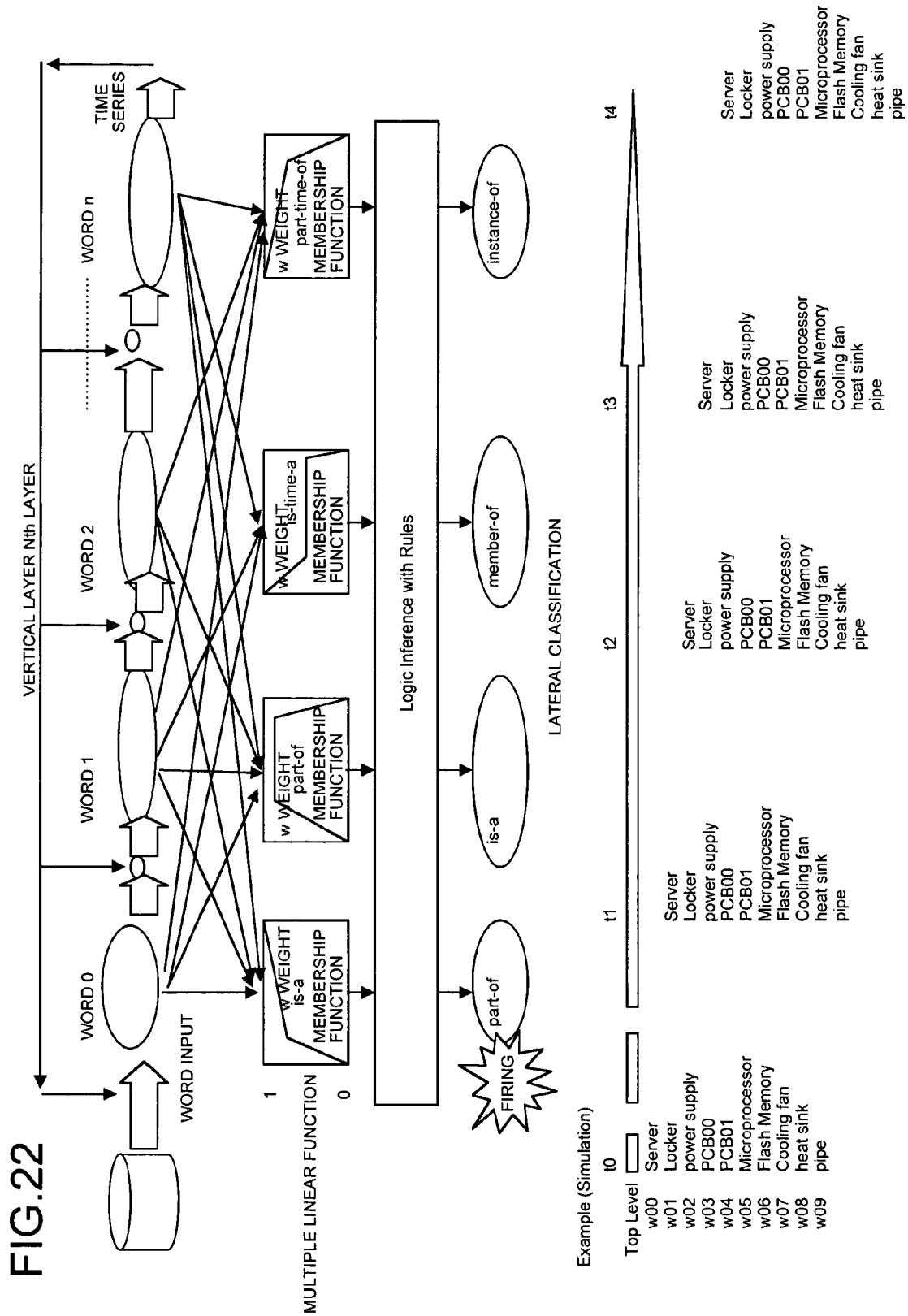
FIG. 22 is a schematic of the fuzzy logic according to the embodiment.

The neural network and the genetic algorithm are used to generate the ontology. It is also possible to use other methods (such as, a fuzzy logic shown in FIG. 22) to generate the ontology.

As explained above, according to one aspect of the present invention, the system generates the ontology as a group of name candidates, with an element set in the installation space as a top level based on the name information obtained in advance. The system links each name that constitutes this ontology with the multimedia information. Therefore, it is possible to improve the efficiency of managing names and multimedia information.

According to another aspect of the present invention, the system sets the security gate that limits a range of names that can be searched for/referred to, according to the environment in which the name is used. Therefore, there is an effect that it is possible to increase the security level.

According to still another aspect of the present invention, the system executes the search for a name corresponding to the name space ontology, and multimedia information that is linked with the name, and outputs a result of the search corresponding to the security gate. Therefore, there is an effect that it is possible to improve the efficiency of search for names and multimedia information.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer program for a multimedia processing method used in a multimedia processing apparatus that includes:
    a multimedia information database that stores multimedia information;
    an ontology information database that stores ontology information;
    a name information database that stores name space information;
    an installation space information database that stores part table list information corresponding to the installation space;
    a registration control unit that controls registration of information at the multimedia information database, at the ontology information database, at the name information database, and at the installation space information database; and
    an ontology generating unit that generates ontology, the ontology generating unit being configured to read the part table list information from the installation space information database and to set name information based on an item to be conceptualized, the program making a computer execute:
    selecting a specific element from an installation space having a plurality of elements where each element to be given a name is hierarchically expressed on one of a plurality of interrated levels;
    generating a name space ontology by setting a table of mutual relationships of concept expressed between two pieces of name information which is ruled as an extensible markup language name space in worldwide web consortium, the mutual relationships including lateral relationships and vertical relationships, wherein the name space ontology is a hierarchy of names assigned to respective elements from the installation space with the selected element having a respective name at a top level of the name space ontology;
    determining a layer depth of the name space; and
    linking each name of the name space ontology with multimedia information related to the element having the name assigned thereto, and storing the multimedia information linked with the name into the multimedia information database.

2. The computer program according to claim 1, wherein the generating includes generating the name space ontology according to the specific element being set.

3. The computer program according to claim 1, further making the computer execute deciding whether to give the specific element set a name from the name candidates in the name space ontology.

4. The computer program according to claim 1, wherein the generating includes collating obtained name information with previously obtained name information, and checking duplication of names based on the collation.

5. The computer program according to claim 4, wherein the generating includes checking the duplication of names within a domain to which the name information belongs.

6. The computer program according to claim 1, wherein the generating includes obtaining name information with an extension.

7. The computer program according to claim 1, further making the computer execute setting a security gate based on an environment in which the name is used, wherein the security gate limits a range of names that can be searched for or referred to.

8. The computer program according to claim 7, further make the computer execute
    searching for a name corresponding to the name space ontology and multimedia information that is linked with the name, and
    outputting a result of the search corresponding to the security gate.

9. A multimedia processing apparatus comprising:
    a multimedia information database that stores multimedia information;
    an ontology information database that stores ontology information;
    a name information database that stores name space information;
    an installation space information database that stores part table list information corresponding to the installation space;
    a registration control unit that controls registration of information at the multimedia information database, at the ontology information database, at the name information database, and at the installation space information database; and
    an ontology generating unit that generates ontology, the ontology generating unit being configured to read the part table list information from the installation space information database and to set name information based on an item to be conceptualized, wherein
    the ontology generating unit is configured to select a specific element from an installation space having a plurality of elements where each element to be given a name is hierarchically expressed on one of a plurality of interrated levels;
    the ontology generating unit is configured to generate a name space ontology by setting a table of mutual relationships of concept expressed between two pieces of name information which is ruled as an extensible markup language name space in worldwide web consortium, the mutual relationships including lateral relationships and vertical relationships, wherein the name space ontology is a hierarchy of names assigned to respective elements from the installation space with the selected element having a respective name at a top level of the name space ontology, and to determine a layer depth of the name space; and the registration control unit is configured to link each name of the name space ontology with multimedia information related to the element having the name assigned thereto, and to store the multimedia information linked with the name into the multimedia information database.

10. A multimedia processing method used in a multimedia processing apparatus that includes:
   a multimedia information database that stores multimedia information;
   an ontology information database that stores ontology information;
   a name information database that stores name space information;
   an installation space information database that stores part table list information corresponding to the installation space;
   a registration control unit that controls registration of information at the multimedia information database, at the ontology information database, at the name information database, and at the installation space information database; and
   an ontology generating unit that generates ontology, the ontology generating unit being configured to read the part table list information from the installation space information database and to set name information based on an item to be conceptualized, the method comprising:
   selecting a specific element from an installation space having a plurality of elements where each element to be given a name is hierarchically expressed on one of a plurality of interrated levels;
   generating a name space ontology by setting a table of mutual relationships of concept expressed between two pieces of name information which is ruled as an extensible markup language name space in worldwide web consortium, the mutual relationships including lateral relationships and vertical relationships, wherein the name space ontology is a hierarchy of names assigned to respective elements from the installation space with the selected element having a respective name at a top level of the name space ontology,
   determining a layer depth of the name space; and
   linking each name of the name space ontology with multimedia information related to the element having the name assigned thereto, and storing the multimedia information linked with the name into the multimedia information database.

11. A name ontology generating method used in a multimedia processing apparatus that includes:
   a multimedia information database that stores multimedia information;
   an ontology information database that stores ontology information;
   a name information database that stores name space information;
   an installation space information database that stores part table list information corresponding to the installation space;
   a registration control unit that controls registration of information at the multimedia information database, at the ontology information database, at the name information database, and at the installation space information database; and
   an ontology generating unit that generates ontology, the ontology generating unit being configured to read the part table list information from the installation space information database and to set name information based on an item to be conceptualized, the method of generating a name ontology for a plurality of elements that are arranged in an hierarchical order and linking multimedia information to the elements after naming the elements, and the method comprising:
   specifying an element as a target element;
   generating name ontology for the target element and all the elements below the target element in the hierarchical order based on name information by setting a table of mutual relationships of concept expressed between two pieces of name information which is ruled as an extensible markup language name space in worldwide web consortium, the mutual relationships including lateral relationships and vertical relationships;
   determining a layer depth of the name space;
   naming the target element and the elements below the target element based on the generated name ontology; and
   linking multimedia information to the elements that are named at the naming, and storing the multimedia information linked to the elements into the multimedia information database.

12. The method according to claim 11, further comprising:
   receiving the name information that is to be used at the generating to generate the name ontology.

13. The method according to claim 11, further comprising:
   selecting a name information, out of a plurality of name information stored in a database of name information, as the name information that is to be used at the generating to generate the name ontology.

14. The method according to claim 11, further comprising:
   generating the name ontology at the generating based on a neural network.

15. The method according to claim 11, further comprising:
   generating the name ontology at the generating based on fuzzy logic.

16. The method according to claim 11, further comprising:
   generating the name ontology at the generating based on a genetic algorithm.

17. The computer program according to claim 1, wherein the name information is organized such that if a sub-element is part of a group element, the name information contains the name of the sub-element, the level of the sub-element, the name of the group element and the level of the group element, and
   the name space ontology is prepared by a process comprising:
   looking for a name;
   determining if the name is compatible with other names in the name space ontology;
   comparing the name with the name information to identify the level associated with the name; and
   determining the mutual relationships between the names based on known hierarchical relationships between the levels.

* * * * *